(12) United States Patent
Xu et al.

(10) Patent No.: US 12,088,938 B2
(45) Date of Patent: Sep. 10, 2024

(54) PIXEL CIRCUIT, IMAGE SENSOR, AND IMAGE PICKUP DEVICE AND METHOD FOR USING THE SAME

(71) Applicant: Shenzhen RGBIC Microelectronics Technology Co., Ltd, Shenzhen (CN)

(72) Inventors: Yang Xu, Shenzhen (CN); Jia Guo, Shenzhen (CN); Zhisheng Li, Shenzhen (CN)

(73) Assignee: SHENZHEN RGBIC MICROELECTRONICS TECHNOLOGY CO., LTD, Shenzhen (CN)

( * ) Notice: Subject to any disclaimer, the term of this patent is extended or adjusted under 35 U.S.C. 154(b) by 140 days.

(21) Appl. No.: 17/940,487

(22) Filed: Sep. 8, 2022

(65) Prior Publication Data

US 2023/0007204 A1    Jan. 5, 2023

Related U.S. Application Data

(63) Continuation of application No. PCT/CN2021/080653, filed on Mar. 14, 2021.

(30) Foreign Application Priority Data

Mar. 17, 2020   (CN) .......................... 202010185899.4
Mar. 17, 2020   (CN) .......................... 202010186173.2

(51) Int. Cl.
*H04N 25/75*     (2023.01)
*H04N 25/53*     (2023.01)
(Continued)

(52) U.S. Cl.
CPC ............. *H04N 25/75* (2023.01); *H04N 25/53* (2023.01); *H04N 25/745* (2023.01); *H04N 25/771* (2023.01)

(58) Field of Classification Search
CPC ...... H04N 25/75; H04N 25/53; H04N 25/745; H04N 25/771
See application file for complete search history.

(56) References Cited

U.S. PATENT DOCUMENTS 7,286,174 B1 * 10/2007 Weale .................... H04N 25/00
                                              348/E3.018
7,697,051 B2    4/2010 Krymski
(Continued)

FOREIGN PATENT DOCUMENTS

| CN | 102447848 A | 5/2012 |
| CN | 103491324 A | 1/2014 |

(Continued)

OTHER PUBLICATIONS

International Search Report issued in International application No. PCT/CN2021/080653, mailed Jun. 22, 2021.
(Continued)

*Primary Examiner* — Nhan T Tran
(74) *Attorney, Agent, or Firm* — BAYES PLLC

(57) ABSTRACT

Embodiments of pixel circuit, image sensor, image pickup device and methods for using the same are provided. In an example, the pixel circuit comprises a source module configured to output non-simultaneously a reference signal indicative of a reset level and an electrical signal indicative of incident light, a sampling module comprising a first sampling unit, a second sampling unit and a sampling switch, a first switch module configured to be electrically coupled between the source module and the sampling module, and a second switch module configured to be electrically coupled between the sampling module and a bus.

20 Claims, 19 Drawing Sheets

(51) Int. Cl.
*H04N 25/71* (2023.01)
*H04N 25/771* (2023.01)

(56) References Cited

U.S. PATENT DOCUMENTS

| | | | |
|---|---|---|---|
| 8,569,671 B2* | 10/2013 | Meynants | ............ H04N 25/59 |
| | | | 250/214 R |
| 8,987,646 B2 | 3/2015 | De Witt et al. | |
| 10,304,888 B2 | 5/2019 | Xiong et al. | |
| 2012/0175499 A1* | 7/2012 | Meynants | ............ H04N 25/59 |
| | | | 250/214 P |
| 2014/0139713 A1 | 5/2014 | Gomi et al. | |
| 2017/0048469 A1* | 2/2017 | Xiong | .................... H04N 25/70 |

FOREIGN PATENT DOCUMENTS

| CN | 103533265 A | | 1/2014 | |
|---|---|---|---|---|
| CN | 104243860 A | * | 12/2014 | ............. H04N 5/351 |
| CN | 104243861 A | | 12/2014 | |
| CN | 104378561 A | | 2/2015 | |
| CN | 110611782 A | | 12/2019 | |
| CN | 111416953 A | | 7/2020 | |

OTHER PUBLICATIONS

Written Opinion of the International Searching Authority issued in International application No. PCT/CN2021/080653, mailed Jun. 22, 2021.
First Office Action issued in corresponding Chinese application No. 202010185899.4, mailed Dec. 22, 2021.
Second Office Action issued in corresponding Chinese application No. 202010185899.4, mailed Mar. 28, 2022.
Notice of Allowance issued in corresponding Chinese application No. 202010185899.4, mailed Jul. 6, 2022.
First Office Action issued in corresponding Chinese application No. 202010186173.2, mailed Dec. 3, 2021.
Notice of Allowance issued in corresponding Chinese application No. 202010186173.2, mailed Mar. 11, 2022.

* cited by examiner

161

PIXEL CIRCUIT, IMAGE SENSOR, AND IMAGE PICKUP DEVICE AND METHOD FOR USING THE SAME

CROSS-REFERENCE TO RELATED APPLICATIONS

This application is a continuation of International Application No. PCT/CN2021/080653 filed on Mar. 14, 2021, which claims the benefit of priority to Chinese Application No. 202010185899.4 filed on Mar. 17, 2020, and Chinese Application No. 202010186173.2 filed on Mar. 17, 2020, the entire contents of which are incorporated herein by reference.

BACKGROUND

Embodiments of the present disclosure relate to electronic devices, and more specifically, to image sensors for electronic devices.

A CMOS image sensor which includes an array of pixels is used to convert incident light into electrical signals. There are two types of CMOS image sensors, electronic rolling shutter sensors and electronic global shutter sensors. An electronic rolling shutter sensor starts exposing the array of pixels line by line, reads electrical signals of the pixels line by line, and finishes reading electrical signals of a frame before the exposure time of the next frame, such that the starting time of exposure of each line is different while the exposure time of each line is the same. This shutter mechanism produces image distortion when capturing images of moving objects. Electronic global shutter sensors can solve image distortion. In an electronic global shutter sensor, all lines begin and stop their exposure at the same time. It is difficult to read all electrical signals from the entire array of pixels simultaneously, so the electronic global shutter sensors need to store the unread electrical signals of a frame in the pixels without affecting the exposure of next frame.

There are two ways for electronic global shutter sensors to store electrical signals converted from the incident light. One is to convert the incident light into voltage signals and store the voltage signals in the pixels. The other is to convert the incident light into charges and store the charges in the pixels. Storing the electrical signals as voltage signals has been implemented in both front-illuminated image sensors and back-illuminated image sensors due to the simple implementation.

FIG. 1 illustrates a conventional circuit of a pixel in an electronic global shutter sensor. Before the end of the exposure time for one frame, the first transistor Sample1 and the second transistor Sample2 in all pixels are turned on, and the first capacitor C1 samples the reset signal voltage at point FD through the source follower M2. After sampling, the transfer gate TX is turned on, and the photon-generated electrons are transferred from the pinned photodiode to the point FD. The photon-generated electrons generate a voltage drop in the capacitance of the point FD. The second transistor Sample2 is turned on again, and the second capacitor C2 re-samples the image signal voltage of the point FD through the source follower M2. After the global sampling is over, the bus switch Select of each row is turned on, and the reset signal voltage Vreset is read out first. Then the first transistor Sample1 is turned on, and the average signal (Vsignal+Vreset)/2 is read out.

In the conventional pixel circuits such as that shown in FIG. 1, the image signal sampled and stored in the capacitor C2 cannot be read out quickly, completely, and directly due to the limitation of the pixel structure. The signal output range is also limited by this structure.

SUMMARY

Embodiments of pixel circuits, image sensors, image pickup devices and methods for capturing images are disclosed herein.

In some examples, a pixel circuit comprises a source module, a sampling module, a first switch module, and a second switch module. The source module may comprise a photosensitive unit and a reset unit configured to reset the photosensitive unit. The source module may be configured to output non-simultaneously a reference signal indicative of a reset level and an electrical signal indicative of incident light received by the photosensitive unit. The sampling module may comprise a first sampling unit, a second sampling unit and a sampling switch. The first switch module may be configured to be electrically coupled between the source module and the sampling module. The second switch module may be configured to be electrically coupled between the sampling module and a bus. The first sampling unit may be configured to be electrically coupled to the first switch module and the second switch module, and the second sampling unit may be configured to be electrically coupled to the first switch module and the second switch module by the sampling switch. The first sampling unit and the second sampling unit are configured to sample and store the signals from the source modules individually.

In some examples, the first sampling unit may comprise a first capacitor coupled between the first switch module and a first reference voltage and the second sampling unit comprises a second capacitor coupled between the sampling switch and a second reference voltage.

In some examples, the sampling switch may be provided outside the electrical path between the first sampling unit and the first switch module, or the sampling switch may be provided outside the electrical path between the first sampling unit and the second switch module. In some examples, the first sampling unit may be configured to sample the electrical signal or the reference signal by pulsing the first switch module from on to off at a first time point, and may be further configured to output the sampled signal to the bus when the second switch module is turned on at a second time point.

In some examples, the sampling switch may be configured to remain turned off at the second time point.

In some examples, the second sampling unit may be configured to sample the electrical signal or reference signal by pulsing the sampling switch from on to off, and the first switch module remains turned on at a third time point, and In some examples, the second sampling unit may be further configured to connect with the first sampling unit when the second switch is turned on after the third time point, so that a weighted average value of the sampled signals in first sampling unit and the second sampling unit may be output to the bus when the second switch module and the sampling switch are both turned on at a fourth time point.

In some examples, the second sampling unit may be configured to sample the electrical signal at the third time point of a first frame, and the first sampling unit may be configured to sample the electrical signal at the first time point of a second frame.

In some examples, first sampled unit may be configured to output the electrical signal of the second frame when the second switch module is turned on, and the sampling switch remains turned off, and the second sampling unit may be further configured to connected with the first sampling unit when the second switch is turned on to output a weighted average value of the two electrical signals from the first frame and the second frame to the bus when the second switch module and the sampling switch are both turned on in the readout period of the second frame.

In some examples, the sampling switch may be a first sampling switch. The sampling module may further comprise a second sampling switch which is configured to be electrically coupled between the first sampling unit and the second switch module. The second sampling switch may be provided outside the electrical path between the second sampling unit and the second switch module.

In some examples, the second sampling switch may be configured to be turned on when the referenced signal or the electrical signal sampled and held in the first sampling unit is readout.

In some examples, the second sampling unit may be configured to sample the reference signal or the electrical signal by pulsing one of the first sampling switch and the second sampling switch from on to off at a fifth time point, and the other sampling switch and the first switch module remains turned on at a fifth time point.

In some examples, the second sampling unit may be further configured to output the sampled signal to the bus when the second switch module and the first sampling switch are both turned on at a sixth time point. The second sampling switch may be configured to be turned off at the sixth time point.

In some examples, the second sampling unit may be configured to sample the electrical signal at the fifth time point of a first frame. The first sampling unit may be configured to sample the electrical signal at the first time point of a second frame. The first sampling unit and the second sampling unit are configured to output the two sampled electrical signals respectively in the readout period of the second frame.

In some examples, the second sampling unit is configured to sample the reference signal at the fifth time point, and output the sampled reference signal to the bus within one frame.

In some examples, the first sampling unit may be configured to sample the electrical signal at the first time point within the frame.

In some examples, the sampled signal of the first sampling unit may be read one or more times during the exposure time of one frame. The first sampling unit may be configured to stop sampling the electrical signal when the current sampled electrical signal reaches a predetermined criterion.

In some examples, the source module may further comprises: a memory element, a transfer switch, and a reset switch. The memory element may be configured to store the reference signal and the electrical signal for non-simultaneous output before sampling. The memory element may be configured to be electrically coupled between the floating node and the ground. The transfer switch may be configured to be electrically coupled between the photosensitive unit and the memory element. The reset switch may be configured to be electrically coupled between the reference power supply and the memory element. The reset switch may be included in a reset unit, and the reset unit could contain one or more reset switches.

In some examples, the first switch module may comprises a first source follower, a first load transistor and a first sampling transistor. The input of the first source follower may be coupled to the source module, and the output of the first source follower may be coupled between a first terminal of the first load transistor and a first terminal of the first sampling transistor. The second terminal of the first load transistor may be grounded. The second terminal of the first sampling transistor may be coupled to the sampling module.

In some examples, the first switch module may comprise a second source follower, a second load transistor and a second sampling transistor. The input of the second source follower may be coupled to the source module, and the output of the second source follower may be coupled to a first terminal of the second sampling transistor. A second terminal of the second sampling transistor may be coupled between the sampling module and the first terminal of the second load transistor. A second terminal of the second load transistor may be grounded.

In some examples, the first switch module may comprises a third source follower and a third sampling transistor. The input of the third source follower may be coupled to the source module, the source terminal of the third source follower may be coupled to a pulsed power supply, and the output of the third source follower may be coupled to a first terminal of the third sampling transistor. A second terminal of the third sampling transistor may be coupled to the sampling module.

According to another aspect of the present disclosure, an image sensor comprising a plurality of pixel circuits is provided. The plurality of pixel circuits may include a pixel circuit as any pixel circuit described herein. The pixel circuit is configured to convert incident light to electrical signals. The image sensor may further comprise a timing controller, one or more buses and one or more readout circuits coupled to the buses. The timing controller may be configured to control the timing of exposure and readout of the plurality of pixel circuits. The one or more buses may be coupled to the plurality of pixel circuits. The one or more readout circuits may be configured to read the electrical signals through the buses and to generate image signals indicative of the incident light based on the electrical signals.

In some examples, the plurality of pixel circuits may include a first pixel circuit, and the timing controller may be configured to control a readout circuit to read the sampled electrical signal of the first sampling unit in the first pixel circuit one or more times during the exposure time of one frame. The timing controller may be further configured to control the first sampling unit in the first pixel circuit to stop sampling the electrical signal when the current sampled electrical signal reaches a predetermined criterion. The readout circuit may be further configured to read final sampled electrical signals of the first sampling units in the plurality of pixel circuits.

In some examples, the one or more readout circuits may be further configured to read sampled reference signals or electrical signals from the first sampling units of the plurality of pixel circuits as the first readout signal, and read sampled reference signals or electrical signals from the second sampling units of the plurality of pixel circuits or the weighted average of the two sampled signals as the second readout signal. The image sensor may be further configured to calculate and output the difference between the first readout signal and the second readout signal based on the readout of the readout circuits.

According to yet another aspect of the present disclosure, an image pickup device is provided. The image pickup device comprises: an image sensor, a lens set, a processor and a display. The image pickup device may include an image sensor as any image sensor described herein. The image sensor may be configured to capture images and output image signals. The lens set configured to focus incident light to the one or more image sensors. The processor may be operably coupled to the image sensor, and may be configured to process the image signals output by the image sensor and to generate one or more images. The display configured to display the images from the processor.

According to still another aspect of the present disclosure, a method of capturing images by an image sensor is provided. The image sensor may comprise a plurality of pixel circuits and buses. Each of the plurality of pixel circuits may comprises a source module, a sampling module, a first switch module and a second switch module. The first switch module may be configured to be electrically coupled between the source module and the sampling module. The second switch module may be configured to be electrically coupled between the sampling module and one of the buses. The source module may comprise a photosensitive unit and a reset unit configured to reset the photosensitive unit. The sampling module may comprise a first sampling unit, a second sampling unit and a sampling switch. The second sampling unit may be configured to electrically coupled to the first switch module and the second switch module by the sampling switch, In some examples, in the method, the source module may output non-simultaneously a reference signal indicative of a reset level and an electrical signal indicative of incident light received by the photosensitive unit. The first sampling unit may sample the electrical signal through turning on the first switch module. Second sampling unit may sample the reference signal through turning on both the first switch module and the sampling switch. The bus may read the sampled signal of the first sampling unit through turning on the second switch module. The bus may further read the sampled signal of the second sampling unit or a weighted average value of the sampled signals of the first and second sampling units, through turning on both the second switch module and the sampling switch.

In some examples, the second sampling unit may sample the electrical signal from a first frame through turning on the first switch module, and one or two sampling switches. The first sampling unit may sample an electrical signal from a second frame through turning on the first switch module. The first frame precedes the second frame. The bus may read the sampled signal of the first sampling unit through turning on the second switch module and the second sampling switch within the readout period of the second frame. The bus may also read the sampled signal of the second sampling unit through turning on the second switch module and the first sampling switch within the readout period of the second frame.

In some examples, the image sensor may further calculate the difference between the two frames or the weighted average of the two frames based on the sampled signal of the first sampling unit and the sampled signal of the second sampling unit.

In some examples, the first sampling unit may sampled and be readout by the bus one or more times during the exposure time of one frame for signal detection. The bus may read out the final image based on the sampled reference signal of the second sampling unit and the sampled electrical signal of the first sampling unit of the whole plurality of pixel circuits, when the current sampled electrical signal of the first sampling unit reaches a predetermined criterion.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

DETAILED DESCRIPTION

Figure 1:
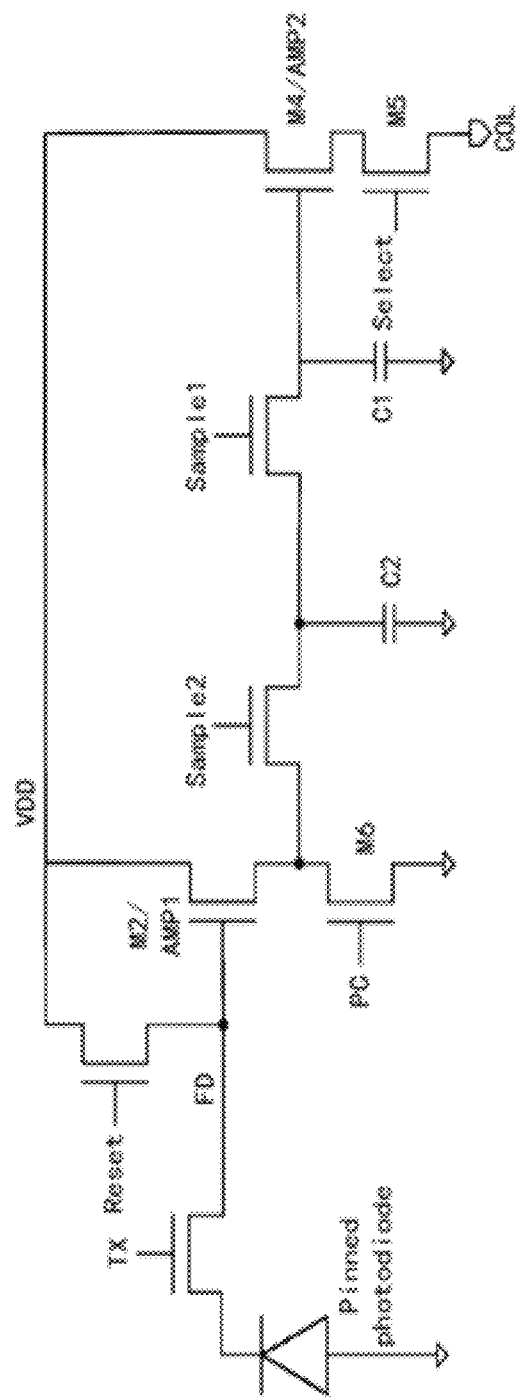
FIG. 1 illustrates a conventional circuit of a pixel in an electronic global shutter sensor.

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," "certain embodiments," etc., indicate that one or more embodiments described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it would be within the knowledge of a person skilled in the pertinent art to effect such feature, structure, or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the terms "based on," "based upon," and terms with similar meaning may be understood as not necessarily intended to convey an exclusive set of factors and may, instead, allow for existence of additional factors not necessarily expressly described, again, depending at least in part on context.

Various aspects of the present disclosure will now be described with reference to various apparatus and methods. These apparatus and methods will be described in the following detailed description and illustrated in the accompanying drawings by various blocks, modules, units, components, circuits, steps, operations, processes, algorithms, etc. (collectively referred to as "elements"). These elements may be implemented using electronic hardware, firmware, computer software, or any combination thereof. Whether such elements are implemented as hardware, firmware, or software depends upon the particular application and design constraints imposed on the overall system.

The term "coupled to," as used herein, may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Figure 2:
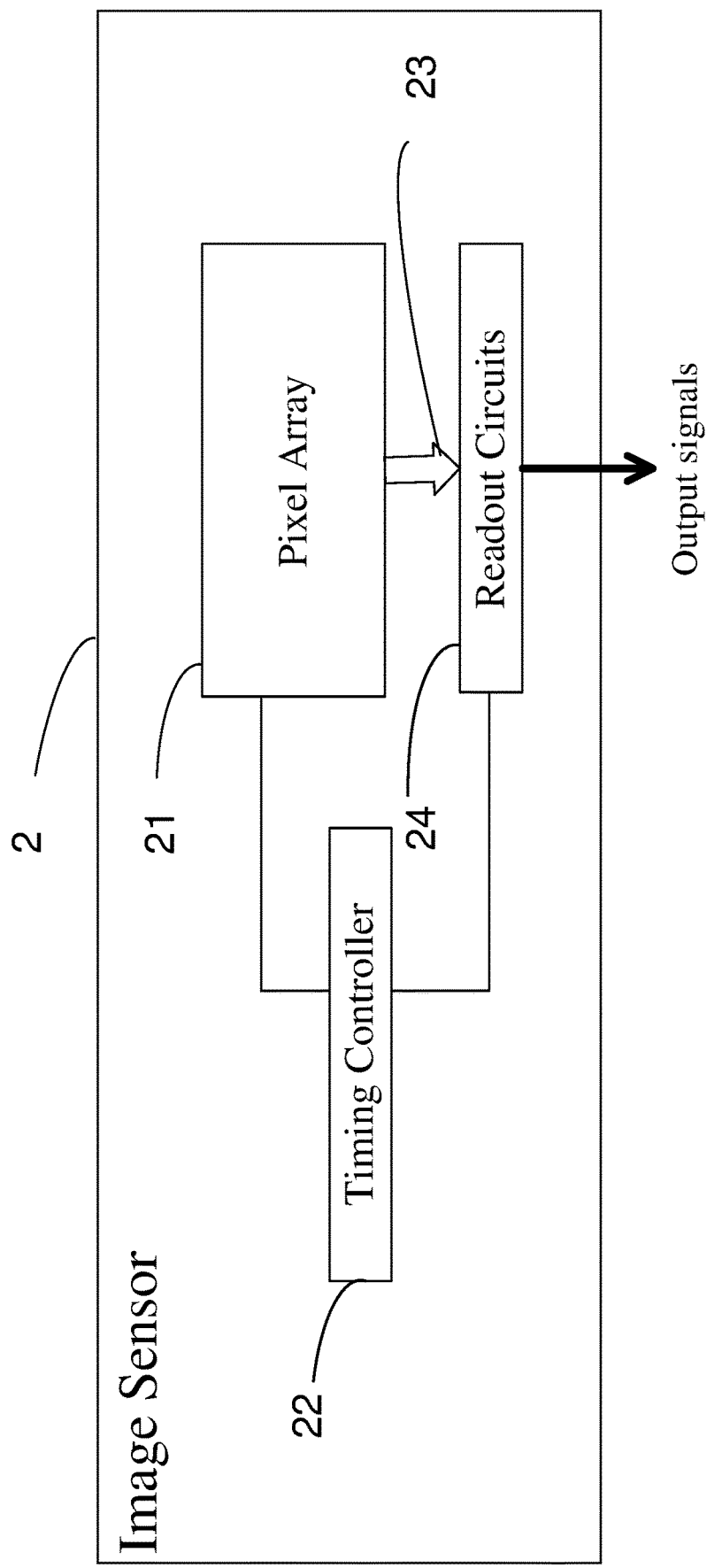
FIG. 2 illustrates a schematic block diagram of an image sensor, in accordance with various embodiments.

FIG. 2 illustrates a schematic block diagram of an image sensor 2, in accordance with various embodiments. The image sensor 2 may be a global shutter image sensor. The image sensor 2 may include a pixel array 21, a timing controller 22, buses 23 and readout circuits 24. The pixel array 21 may convert incident light to electrical signals, and may include a plurality of pixels arranged in an array that includes a first number of columns and a second number of rows. The first and the second numbers may be the same or different according to design goals. The number of pixels per column may be the same or different. Likewise, the number of pixels per row may be the same or different. In some embodiments, the image sensor 2 may include at least one million pixels. Each pixel may include a pixel circuit.

According to the present disclosure, each bus 23 may be coupled to one column of pixel array 21. The reference signals and the electrical signals generated by each pixel in pixel array 21 are transmitted to buses 23. The readout circuit 24 may read the electrical signals through the buses 23, and output the corresponding signals indicative of the incident light based on the electrical signals. In some embodiments, the array of pixel scan be exposed at the same time and be read row by row. The pixel circuits in the pixel array 21 may include a plurality of switches. The timing controller 22 may be implemented by integrated circuits and may control each of the plurality of pixel circuits to enter an exposure period, the global sampling period, or a readout period by generating pulse signals to the switch of each pixel circuit. The timing controller 22 may also control the timing of the readout circuits 24, or alternatively both the timing controller 22 and the readout circuits 24 may be controlled by the pulse signals provided from outside of the image sensor 2.

Figure 3:
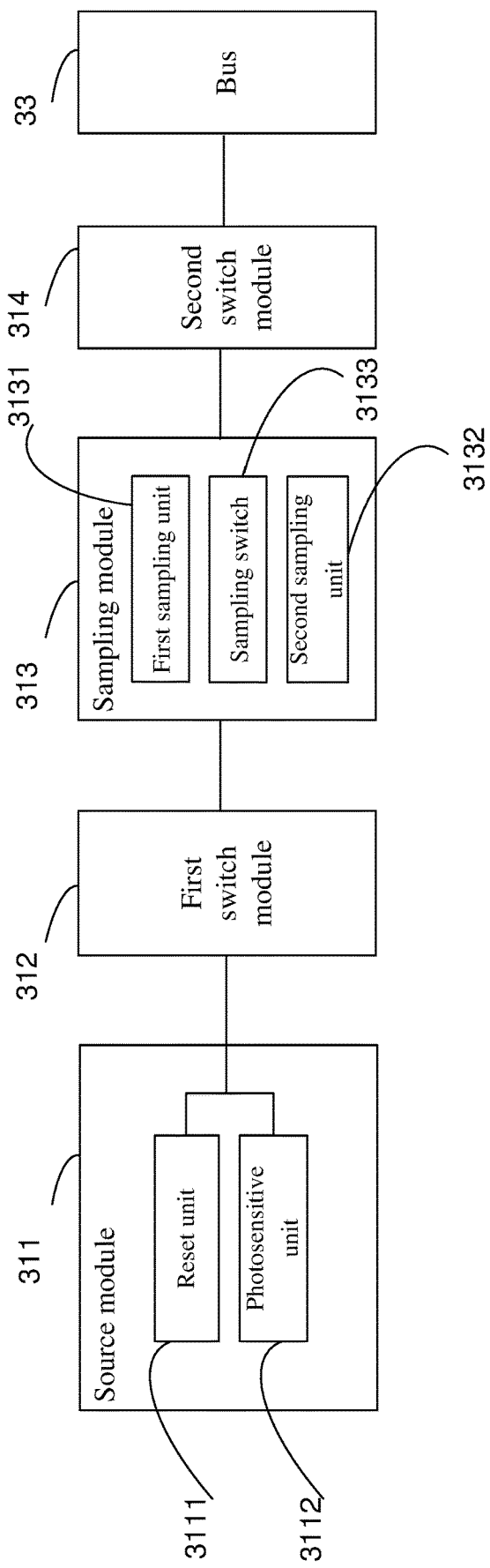
FIG. 3 illustrates an exemplary schematic block diagram of a pixel circuit, in accordance with various embodiments.

FIG. 3 illustrates an exemplary schematic block diagram of a pixel circuit 31, in accordance with various embodiments. The pixel circuit 31 may include a source module 311, a first switch module 312, a sampling module 313, and a second switch module 314. The source module 311 may include a reset unit 3111 and a photosensitive unit 3112. The reset unit 3111 may reset the photosensitive unit 3112 before exposure. The photosensitive unit 3112 may receive incident light corresponding to a portion of a scene being imaged during exposure, and generate an electrical signal proportional to the light intensity of the image.

The source module 311 may output non-simultaneously a reference signal indicative of the reset level of the source module 311 and the electrical signal generated by the photosensitive unit 3112 from the same node or from different nodes.

The first switch module 312 may be electrically coupled between the source module 311 and the sampling module 313. The sampling module 313 may be used to sample and hold the different outputs of the source module 311 by turning on the first switch module 312 at different times. For example, during the global sampling period, the source module 311 may transmit the reference signal to the sampling module 313 from a node by turning on the first switch module 312 first, and then transmit the electrical signal to the sampling module 313 from the node by turning on the first switch module 312 again. The reference signal and the electrical signal may be sampled by the sampling module 313 in turn.

The second switch module 314 may be electrically coupled between the sampling module 313 and the bus 33 in the sensor. After the exposure of one frame of the image and the completion of the global sampling period, the sampling module 314 may be used to output different sampled signals by turning on the second switch module 314 at different times.

In some embodiments, the sampling module 313 may include a first sampling unit 3131, a second sampling unit 3132 and a sampling switch 3133. The first sampling unit 3131 may be electrically coupled to the first switch module 312 and the second switch module 314. The second sampling unit 3132 may be electrically coupled to the first switch module 312 and the second switch module 314 by the sampling switch 3133.

In some embodiments, the sampling switch 3133 may be provided outside the electrical path between the first sampling unit 3131 and the first switch module 312, thus avoiding the influence of the second sampling unit 3132 and the sampling switch 3133 on the first sampling unit 3131 when sampling signals from the source module 311.

In other embodiments, the sampling switch 3133 may be provided outside the electrical path between the first sampling unit 3131 and the second switch module 314, thus avoiding the influence of the second sampling unit 3132 and the sampling switch 3133 on the first sampling unit 3131 when transmitting signals to the bus 33.

According to the present disclosure, the reference signal and the electrical signal from the source module 311 may be sampled and held by different sampling units. Due to the sampling switch 3133, the mutual influence between the first sampling unit 3131 and the second sampling unit 3132 during sampling from the source module 311 and outputting signals to the bus 33 can be reduced or eliminated by turning on or off the sampling switch 3133.

In some embodiments, the first sampling unit 3131 may sample one of the electrical signal and the reference signal by pulsing the first switch module 312 at a first time point, and may output the sampled signal to the bus 33 at a second time point when the second switch module 314 is turned on. The sampling switch 3133 may be remain turned off at the second time point, reducing or eliminating the influence of the sampled signal in the second sampling unit 3132 on the readout of the sampled signal in the first sampling unit 3131.

In other embodiments, the second sampling unit 3132 may sample one of the electrical signal and the reference signal by pulsing the sampling switch 3133 at a third time point when the first switch module remains turned on. The first sampling unit 3131 may be directly coupled to the second switch module 314 and the sampling switch 3133. Since the sampled signal of the first sampling unit 3131 and the sampled signal of the second sampling unit 3132 may be weighted averaged, the sampling module 312 may output a weighted average value of the electrical signal and the reference signal to the bus 33 when the second switch module 312 and the sampling switch 3133 are both turned on at a fourth time point. The weighted average value depends on the sampled signals and the capacitance of the two sampling units 3131 and 3132.

In some embodiments, both the sampling of the first sample unit (at the first time point) and that of the second sample unit (at the third time point) occur simultaneously for all pixels in the pixel array during global shutter operation. As the electrical signal and the reference signal are both sampled and the image signal of the pixel can be derived from the electrical signal and the reference signal, the offset variation induced by different devices in the pixel circuits can be cancelled. As the two sampling time points (the first time point and the third time point) are very close, and the signal holding time for each of the sampling units (3131, and 3132) are similar, the parasitic light influence on two sampling units 3131 and 3132 may be the same. Therefore, the parasitic light sensitivity can be effectively suppressed through correlated double sampling, and the fixed deviation noise of the difference between the two sampling readouts can be eliminated.

Figure 4:
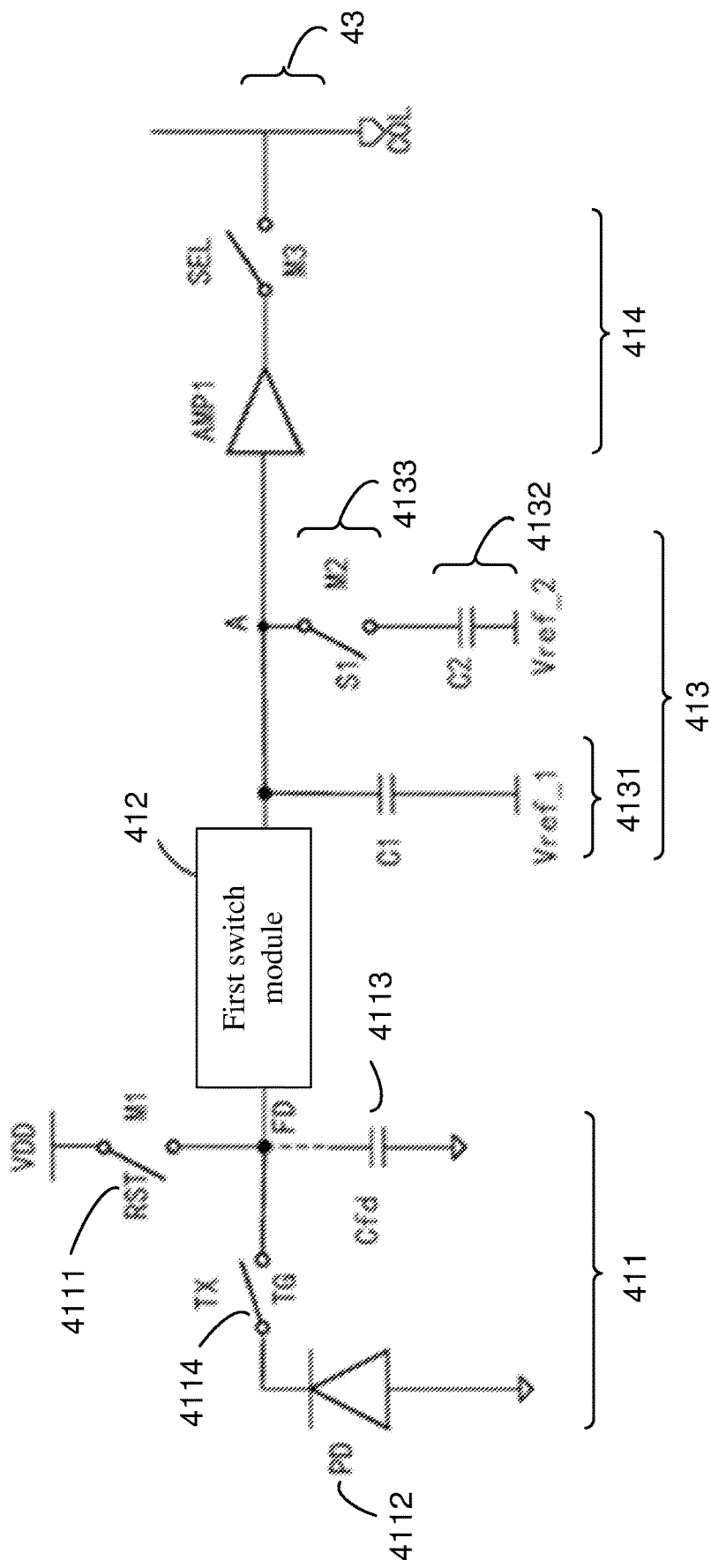
FIG. 4 illustrates an exemplary schematic diagram of a pixel circuit, in accordance with various embodiments.

FIG. 4 illustrates an exemplary schematic diagram of a pixel circuit 41, in accordance with various embodiments. As shown in FIG. 4, the source module 411 may include a memory element 4113, which is coupled to the first switch module 412 by a floating node FD. The photosensitive unit 4112 may include a photodiode PD. In some embodiments, the photodiode PD in the photosensitive unit 4112 is a pinned photodiode to improve the performance of the pixel. The source module 411 may further include a transfer switch 4114 (such as a transfer gate TG shown in FIG. 4) which may be electrically coupled between the photodiode PD and the memory element 4113. The reset unit 4111 of the source module 411 may include a reset switch (such as a switch M1 shown in FIG. 4) which may be electrically coupled between the reference power supply (VDD_RST) and the floating node FD. As shown in FIG. 4, the memory elements 4113 may include a capacitor. Thus, the capacitance of the floating node FD to ground may include that of a conventional capacitor and parasitic capacitance Cfd.

In some embodiments, as shown in FIG. 4, the anode of the photodiode PD is grounded, and the cathode of the photodiode PD is coupled to the one terminal of the transfer gate TG. The other terminal of the transfer gate TG is coupled to the floating node FD to form a floating diffusion region. The control terminal of the transfer gate TG is coupled to the exposure control signal TX. One terminal of the reset switch M1 is coupled to the floating node FD, and the other terminal of the reset switch M1 is coupled to the reference power supply VDD_RST. The control terminal of the reset switch M1 is coupled to the reset control signal RST. The source module 411 is coupled to one terminal of the first switch module 412 by the floating node FD. The other terminal of the first switch module 412 is coupled to the sampling module by a node A.

In some embodiments, as shown in FIG. 4, the first sampling unit 4131 may include a capacitor C1 coupled between a first reference voltage Vref_1 and the node A. The sampling switch 4133 may include a switch M2 electrically coupled to both the first switch module 412 and the second switch module 414 by node A. The second sampling unit may include a capacitor C2 coupled to a second reference voltage Vref_2 and the switch M2 respectively. The control terminal of the switch M2 is coupled to a sampling control signal S1.

In some embodiments, the second switch module 414 may include a select switch M3 to control the output of the pixel. Further, the second switch module 414 includes an amplifier AMP1 configured to amplify the output signals of the sampling module 413. The input of the amplifier AMP1 is coupled to the sampling module 413 by node A, and the output of the AMP1 is coupled to the select switch M3. The select switch M3 is coupled between the amplifier AMP1 and a bus 43. The control terminal of M3 is coupled to a select signal SEL.

Figure 5:
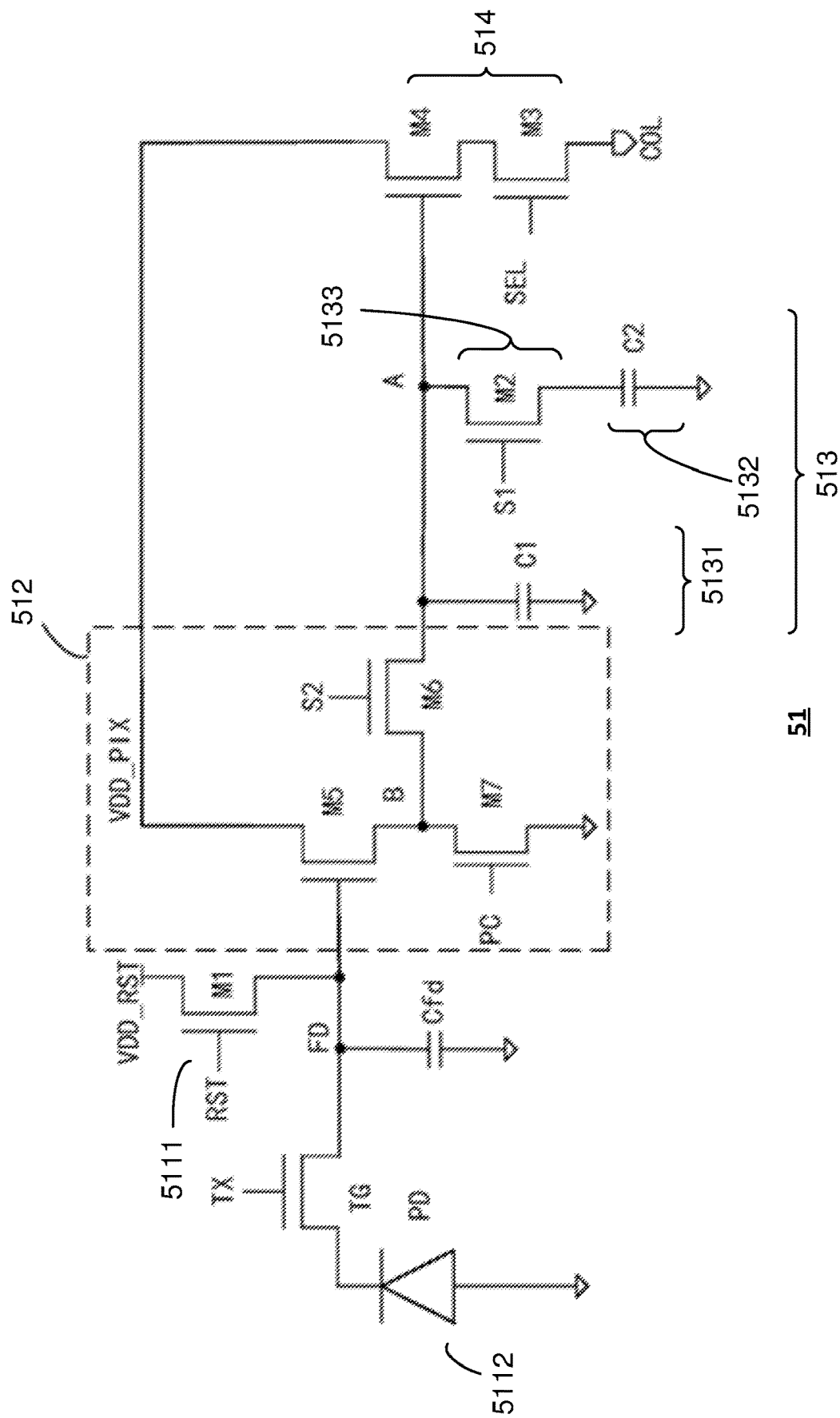
FIG. 5 illustrates an exemplary schematic diagram of a first switch module and a second switch module in the pixel circuit, in accordance with various embodiments.

FIG. 5 illustrates an exemplary schematic diagram of a first switch module 512 and a second switch module 514 in a pixel circuit 51, in accordance with various embodiments.

The first switch module 512 may comprise a first amplifier, a first load transistor and a first sampling transistor. In some embodiments, the first amplifier may be the first source follower. The input of the first source follower can be coupled to the source module, and the output of the first source follower can be coupled between a first terminal of the first load transistor and a first terminal of the first sampling transistor. A second terminal of the first load transistor can be grounded, and a second terminal of the first sampling transistor can be coupled to the sampling module.

For example, as shown in FIG. 5, the first switch module 512 may include a transistor M5 (a first source follower), a transistor M6 (a first sampling transistor) and a transistor M7

(a first load transistor). For the transistors M6 an M7 and other switch devices, the control terminal of the field effect transistor may be the gate terminal of the field effect transistor. The other two connecting terminals of the switch may be the drain and source terminals. The gate of the transistor M5 (the input of the first source follower) is coupled to the floating node FD. The source of the transistor M5 (the output of the first source follower), the drain of the transistor M7, and the source/drain of the transistor M6 are coupled to the same node (node B shown in FIG. 5) in the pixel circuit 51. The drain of the transistor M5 is coupled to a second power supply VDD_PIX. The second power supply VDD_PIX and the reference power supply VDD_RST may be the same power signal or different power signals, depending on the application of the present disclosure. The source/drain of the transistor M6 is coupled to the first sampling unit 5131. The source of the transistor M7 is coupled to the power ground.

The first sampling unit 5131 may include a capacitor C1 coupled between a first reference voltage Vref_1 and the switch transistor M6. The sampling switch 5133 may include a switch M2 electrically coupled to both the first switch module 512 and the second switch module 514. The second sampling unit 5132 may include a capacitor C2 coupled to a second reference voltage Vref_2 and the switch M2 respectively. The switch M2 may include a transistor.

The amplifier AMP1 may include a source follower transistor M4. As shown in FIG. 5, a switch transistor M3 and/or the source follower transistor M4 may each include a transistor. The gate of the transistor M4 is coupled to the sampling module 513, the drain of the transistor M4 is coupled to the second power VDD_PIX, and the source of the transistor M4 is coupled to the drain/source of the switch transistor M3. The source/drain of the transistor M3 is coupled to the bus COL, and the gate of the transistor M3 can be controlled by a row selection signal SEL.

In the pixel circuit 51 shown in FIG. 5, the gate of the reset switch transistor M1 is controlled by a control signal RST, the gate of the transfer gate transistor TG is controlled by a control signal TX, the gate of the transistor M6 is controlled by a control signal S2, the gate of the transistor M7 is controlled by a control signal PC, and the gate of the transistor M2 is controlled by a control signal S1. The timing controller (not shown in FIG. 5) may control the working sequence of each component in the pixel circuit 51 by inputting control signals to the gate of each switch.

Figure 6:
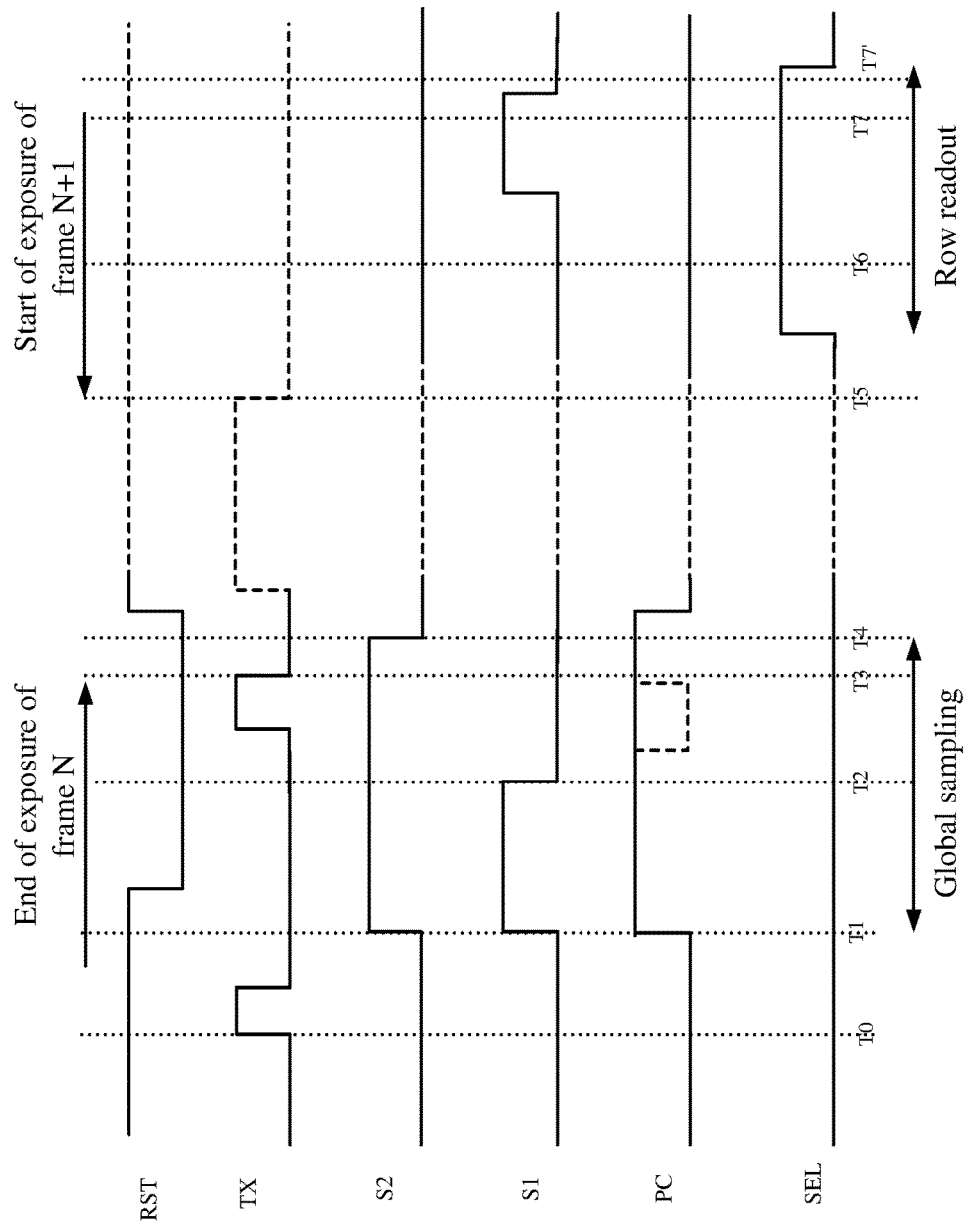
FIG. 6 illustrates an exemplary timing sequence diagram showing a global sampling period and one row readout period of the pixel circuit in FIG. 5, in accordance with various embodiments.

FIG. 6 illustrates an exemplary timing sequence diagram showing a global sampling period and one row readout period of the pixel circuit 51 in FIG. 5, in accordance with various embodiments. The pixel circuit 51 may take the following steps.

Step 1: the photosensitive unit 5112 is reset by the reset unit 5111 before the exposure of a frame.

For example, as shown in FIG. 6, at time T0 the control signal TX rises from a low level to a high level and the control signal RST stays at a high level, which turns on the transfer gate TG and the reset switch M1. Therefore, the photodiode PD and the floating node FD are both reset. Then the control signal TX is changed from a high level to a low level, which turns off the transfer gate TG. The photodiode PD begins to be exposed.

Step 2: the second sampling unit 5132 samples the reference signal indicative of the reset level before the exposure of the frame finishes.

In some embodiments, the capacitor C2 can be discharged first, and then be reset to a reset voltage. For example, as shown in FIG. 6, at time T1 and before the exposure of the photodiode PD finishes, by pulsing the control signal S1, the control signal S2, and the control signal PC, the transistors M2, M6 and M7 are all turned on and the capacitors C1 and C2 are discharged. The control signal RST stays at a high level, and thus the voltage of the floating node FD stays at a reset voltage Vreset_0. Subsequently, the control signal RST falls to a low level, thus the transistor M1 is turned off. At time T2 the control signal S1 falls to a low level, and thus the transistor M2 is turned off, and the reset voltage Vreset_0 is sampled and stored in the capacitor C2.

Step 3: the first sampling unit 5131 samples the electrical signal from the photosensitive unit 5112 after the exposure of the frame finishes.

For example, as shown in FIG. 6, before the exposure of the frame finishes, the control signal TX rises from a low level to a high level, and the transfer gate TG is turned on so that the photon-generated electrons accumulated in the photodiode PD are transferred to the capacitor of the floating node FD. The voltage drop of the floating node FD may be proportional to the number of transferred electrons. After the electrons is completely transferred, at time T3 the control signal TX falls to a low level, and the transfer gate TG is turned off. At time T4 the control signal S2 falls to a low level, the transistor M6 is turned off, and the sampling period of the sampling module 513 finishes. The voltage of the floating node FD indicative of the electrical signal from the photosensitive unit 5112 is sampled and stored in the capacitor C1. Then the control signal PC falls from a high biasing level to a low biasing level, and the transistor M7 is turned off.

Step 4: the sampled signal of the sampling module 513 may be transmitted to the bus after global sampling period and may be read out by a readout circuit.

In some embodiments, the electrical signal sampled in the first sampling unit 5131 and the reference signal sampled in the second sampling unit 5132 are read out to the bus sequentially for deriving the image signal of the pixel circuit 51.

Step 4a: the electrical signal sampled by the first sampling unit 5131 may be transmitted to the bus after the global sampling period and may be read out by a readout circuit. As shown in FIG. 6, the row selection signal SEL of the row including the pixel circuit 51 rises from a low level to a high level, and the transistor M3 is turned on. The transistor M4 amplifies the sampled electrical signal of the capacitor C1 and transmits it to the bus. At time T6, the output signal from the capacitor C1 is read out by the readout circuit.

Step 4b: the weighted average of the electrical signal sampled by the first sampling unit 5131 and the reference signal sampled by the second sampling unit 5132 are transmitted to the bus after the global sampling period and read out by a readout circuit. As shown in FIG. 6, after time T6, the control signal S1 is changed to a high level to turn on the transistor M2. According to the law of charge conservation, the signal stored in the capacitor C1 and the signal stored in the capacitor C2 will be redistributed based on the values of C1 and C2. If the capacitance value of C1 and C1 are same, the averaged signal value of two sampled signals is read. In one embodiment, the weighted average signal value is read by the readout circuit through the bus at time T7. In this way the thermal noise in the readout signal of the readout circuit can be decreased. In another embodiment, the control signal S1 falls to a low level before time T7', and the weighted average signal value is read by the readout circuit through the bus at time T7'. In this way the fixed pattern noise in the readout signal of the readout circuit can be avoided or decreased.

In some embodiments, the image signal of the pixel circuit 51 may be determined based on the gain of the transistor M4 and the difference between the sampled signal of the capacitor C1 and the sampled signal of the capacitor C2.

After the global sampling period, the control signals TX and RST may be both raised to a high level to turn on the transfer gate TG and the transistor M1, and thus the photodiode PD and the floating node FD are reset to wait for the exposure of next frame. For example, as shown in FIG. 6, the control signals TX and RST are raised to a high level after time T4. In these embodiments, the reset period of the photosensitive unit 5112 may overlap with the readout period of the sampling module 513. The exposure period of a frame of image may overlap with the pixel readout period of a previous frame of image. In FIG. 6, only one row readout is shown. However, for the real timing the image sensor, signals of the pixel array will be readout row by row after the global sampling period.

In the embodiments shown in FIGS. 4-6, the first sampling unit 5131 may sample the electrical signal, and the second sampling unit 5132 may sample the reference signal. Therefore, the electrical signal can be read during the readout time directly, which has the benefit of quickly obtaining image information and speeding up the subsequent image processing.

Moreover, the image sensor according to the present disclosure can read only the electrical signal of the current frame of the image sampled by the first sampling unit 5131, without being mixed up with the signal sampled by the second sampling unit 5132. This allows application to a variety of scenarios. For example, the image sensor can use the electrical signal sampled by the first sampling unit 5131 for non-destructive detection of an image signal. In an example of non-destructive detection of image signal, the image sensor can read one or more times the value of the signal indicative of the current exposure amount during a long and continuous exposure, rather than waiting until the exposure period of the current frame finishes. For example, the first sampling unit 5131 can sample the electrical signal one or more times during the exposure period of one frame, and stop sampling the electrical signal when the current sampled electrical signal reaches a predetermined criterion. A non-destructive detection of the image signal can be illustrated with reference to FIG. 7. In this way, the sensor can detect not only the intensity of the light signal, but also the timing of the light pulse signal.

Figure 7:
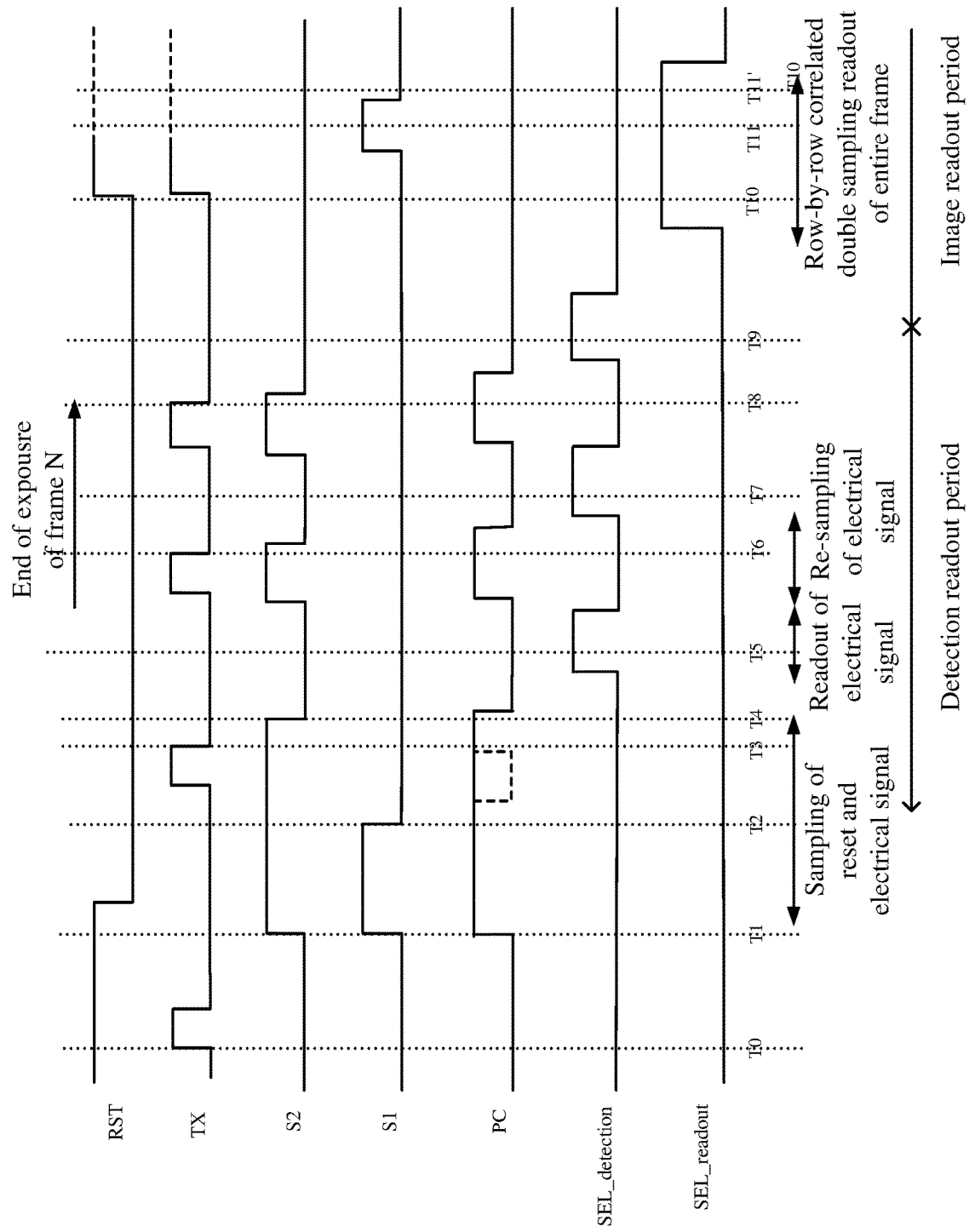
FIG. 7 illustrates another exemplary timing sequence diagram showing a detection signal sample and readout period, and image signal readout period of the pixel circuit in FIG. 5, in accordance with various embodiments. The pixel circuit may take the following steps.

FIG. 7 illustrates another exemplary timing sequence diagram showing a detection signal sample and readout period, and image signal readout of the pixel circuit 51 in FIG. 5, in accordance with various embodiments. This timing sequence can be used for the scenarios which need the non-destructive detection of an image signal. The pixel circuit 51 may take the following steps.

Step 1: the photosensitive unit 5112 and the FD node is reset by the reset unit 5111 and the transfer gate TG before the exposure of a frame.

Step 2: for the whole plurality of pixel circuits which are used for imaging, the second sampling unit 5132 samples the reference signal indicative of the reset level before the charge starts being transferred.

In some embodiments, the timing sequence of the control signals for the above operations in FIG. 7 may be the same as that in FIG. 6. As shown in FIG. 6 and FIG. 7, the timing diagrams before time T2 in both figures are the same.

Step 3: in the signal detection period, as shown in FIG. 7, from time T2 to T9, the first sampling module 5131 may sample the generated electrons multiple times by turning on the transfer gate TG and the first switch module 512 multiple times, the sampled electrical signals of the detected pixels are transmitted to the bus during the exposure period and read by a readout circuit multiple times.

Step 3a (detection signal sampling and readout): during the exposure time, the reset voltage is already held in the second sampling unit 5132, and the electrical signal is sampled for all pixels. The sampled electrical signal from the detection pixels will be readout.

For example, as shown in FIG. 7, after time T2, the RST signal is kept at a low level. The control signal TX, rises to a high level again, and the control signals S2 and PC are also at a high level. The transfer gate TG is turned on, and the electrical signal indicative of the accumulated photon-generated electrons through time T3 by the photodiode PD is transferred to the floating node FD and sampled by the capacitor C1. The row selection signal SEL of the row including the pixel circuit 51 rises from a low level to a high level after time T4 during the exposure period of the pixel circuit 51, and the sampled signal of the capacitor C1 is transmitted to the bus through the transistor M3 and read by a readout circuit at time T5. The readout signal at time T5 is V0.

Step 3b (detection signal compared with a predetermined criterion): If the readout signal V0 of the detection pixels reaches a predetermined criterion which means the accumulated light signal has achieved a target value. The sensor having the pixel circuit 51 will enter to image readout period (Step 4) directly.

If the readout signal V0 does not reach the predetermined criterion, repeat Steps 3a and 3b. For example, as shown in FIG. 7, if the readout signal V0 does not reach the predetermined criterion, the exposure time goes on. Therefore, the RST signal remains at a low level. The control signals TX, S2 and PC rise to a high level again, the transfer gate TG is turned on, and the electrical signal indicative of the accumulated photoelectric charge generated by the photodiode PD is transferred to the floating node FD and sampled by the capacitor C1.

At time T6, the control signal TX falls to a low level, and the transfer gate TG is turned off. The voltage of the floating node FD changes from $V\_t5$ to $V\_t6$. The magnitude of the voltage change may be proportional to the magnitude of the light incident to the photodiode PD and the time difference between the two turn-offs of the control signal TX, that is, the length from time T3 to time T6. After time T6, the control signals S2 and PC fall to a low level to turn off the first switch module 512. Subsequently, the row selection signal SEL rises to a high level and the sampled signal of the capacitor C1 is output to the bus through the second switch module 514 for determining whether it reaches the predetermined criterion.

As shown in FIG. 7, after the third sampling at time T8 and readout of the capacitor C1 at time T9, the readout of the sampled signal of the capacitor C1 has reached the predetermined criterion. The control signal TX and RST could be raised after time T9. The photosensitive unit 5112 and the FD node are reset by the reset unit 5111 and the transfer gate TG. Then the exposure of the frame N is ended in the last charge transfer at time T8.

Step 4: as the readout signal has reached the predetermined criterion, the detection readout period finishes, and the image readout period starts. The sampled signal of the sampling module 513 is transmitted to the bus and read by a readout circuit.

For example, as shown in FIG. 7, the sampled signal of the first sampling unit 5131 and that of the second sampling unit 5132 are read sequentially by the readout circuit. In some embodiments, the timing of the control signals for reading signals sampled by the capacitors C1 and C2, such as the timing of the control signals after time T10 in FIG. 7, can be the same as that in FIG. 6.

In some embodiments, only some of the plurality of pixel circuits (detection pixels) may be used for non-destructive detection which goes through the detection readout period (Step 3). And the whole plurality of pixel circuits may wait until the readout signal sampled by detection pixels meets some predetermined criteria, then go to the image readout period (Step 4) directly for the normal image sensor readout of the whole array. As shown in FIG. 7, only the gates of the transistors M3 in the chosen rows of pixel circuits are controlled by the control signal SEL_detection, while the gates of the transistors M3 of the whole pixel array are controlled by the control signal SEL readout.

By decreasing the quantity of the detection pixels, the processing speed and the frequency of the detection signal is increased, but the accuracy and resolution of the detection in the whole field of view is decreased. The predetermined criteria and evaluation algorithm could be vary according to different application scenarios.

In some embodiments, a processor may be configured to obtain scene information, evaluate the detection signal, and determine the criteria based on the scene information. This processor can be included in the image sensor or outside of the image sensor. This processor may be included in the whole imaging system. As described in FIG. 7, the timing controller may control the first sampling unit 5131 in the pixel circuit 51 to sample the electrical signal one or more times during the exposure time of one frame, and the readout circuit or the processor may determine whether the current sampled electrical signal of the first sampling unit 5131 reaches a predetermined criterion. The timing controller may further control the first sampling unit 5131 to stop sampling the electrical signal when the current sampled electrical signal reaches a predetermined criterion. The readout circuit may further read the final sampled electrical signal from the first sampling unit 5131. As the electrical signal of the current frame of the image sampled by the first sampling unit 5131 is read quickly, the magnitude of the incident light can be detected in real time by multiple readouts of the electrical signal during the exposure time, thus realizing the non-destructive detection of the image signal. This facilitates a determination whether to end the current exposure.

In some embodiments, the image sensor may further include a processor configured to increase or reduce the spatial range and the quantity of the detection pixels in the whole pixel array according to the sampled electrical signal read by the readout circuit during the detection and imaging. In some embodiments, the processor may be further controlled to change the gain of the pixels, the gain of the readout circuits, and/or the full well capacity according to the detected signal levels of the plurality of pixels, which helps achieve a high dynamic range imaging.

In some embodiments, the first sampling unit and the second sampling unit may not be limited to sampling the reference signal and the electrical signal respectively from the photosensitive unit. Other related signals can be sampled and stored in the two sampling units. In some embodiments, the electrical signal of two continuous frames may be sampled and held in the sampling unit 513, and the differential image of two adjacent frames and the weighted average image of two adjacent frames can be derived from the output of the pixel circuit.

For example, the second sampling unit may sample the electrical signal of a first frame from the photosensitive unit, which may be saved to be read in the readout time of a second frame next to the first frame. The first sampling unit may sample the electrical signal of the second frame from the photosensitive unit. The electrical signal of the first frame stored in the second sampling unit and the electrical signal of the second frame stored in the first sampling unit can be both read in the readout time of the second frame.

Figure 8:
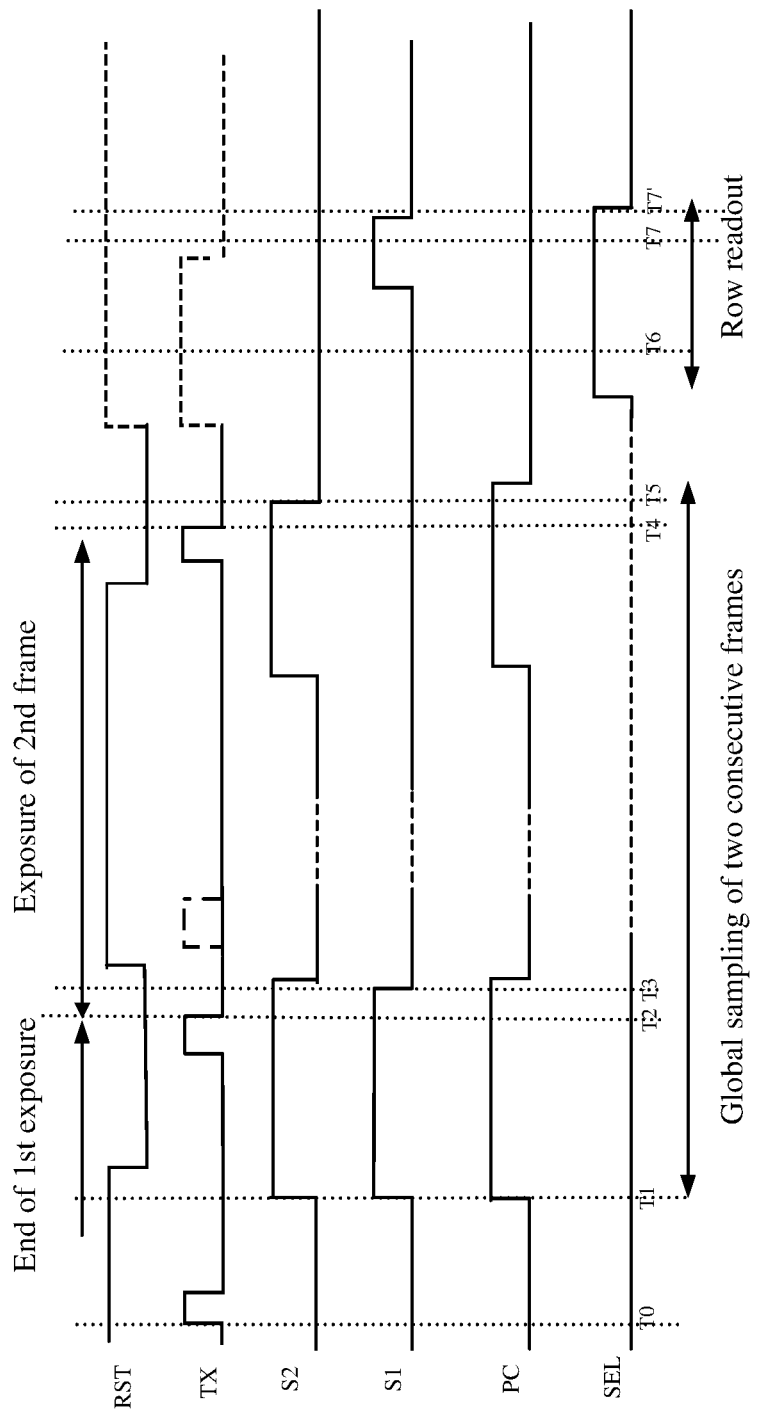
FIG. 8 illustrates yet another exemplary timing sequence diagram showing the global sampling operation and one row readout period of the pixel circuit in FIG. 5 within two adjacent frames, in accordance with various embodiments.

FIG. 8 illustrates another exemplary timing sequence diagram showing the global sampling operations and one row of a readout period of the pixel circuit 51 in FIG. 5 within two adjacent frames, in accordance with various embodiments. This timing sequence can be used to quickly readout and detect the differences of the adjacent frames. The two adjacent frames include a first frame and a second frame following with the first frame. The pixel circuit 51 may take the following steps.

Step 1: the photosensitive unit 5112 is reset by the reset unit 5111 before the exposure of the first frame. For example, the timing sequence of the control signals for Step 1 in FIG. 8 can be the same as that in FIG. 6.

Step 2: the second sampling unit 5132 samples the electrical signal of the first frame from the photosensitive unit 5112 after the exposure of the first frame ends.

For example, as shown in FIG. 8, before the exposure of the first frame finishes, the control signal TX rises from a low level to a high level to turn on the transfer gate TG, so that the charge accumulated by the photodiode PD is transferred to the floating node FD through the transfer gate TG. The voltage of the floating node FD may decrease as the amount of transferred charge increases. At time T2 when the charge transfer is completed, the control signal TX falls to a low level to turn off the transfer gate TG, and the exposure of the pixel circuit 51 in the first frame is cut off. At this time, the voltage of the floating node FD is indicative of the image signal of the pixel in the first frame.

At time T3, the control signal S1 falls to a low level to turn on the transistor M2, and the voltage of the floating node FD indicative of the image signal of the first frame is sampled by the capacitor C2 through the first switch module 512 and the transistor M2. Then the control signals PC and S2 fall to a low level to turn off the first switch module 512. The global sampling period of the first frame of image ends.

Step 3: the first sampling unit 5131 samples the electrical signal of the second frame from the photosensitive unit 5112 after the exposure of the second frame ends.

In some embodiments, the exposure of the second frame starts right after the sampling period of the first frame. The transfer gate TG remains turned off after the sampling period of the first frame. In some embodiments, before the exposure of the second frames, the transfer gate TG is turn on to reset the photosensitive unit 5112. The exposure of the second frame is started by controlling by the signal TX. When the TX signal falls to a low level, the exposure starts. Before the exposure of the second frame ends, the control signals S2 and PC rise to a high level to turn on the first switch module 512, thus the capacitor C1 is reset. Then the control signal TX rises to a high level to turn on the transfer gate TG, so that the charge accumulated by the photodiode PD during the exposure of the second frame is transferred to the floating node FD. At time T4 the charge transfer is completed, and the control signal TX falls to a low level to turn off the transfer gate TG, which cuts off the exposure of the second frame. Then the control signals S2 and PC rise to a high level to turn on the transistor M5 and the transistor M6. The voltage of the floating node FD indicative of the image signal of the second frame is sampled by the capacitor C1. At time T5, the control signal S2 falls to a low level to turn off the transistor M6. Subsequently the control signal PC falls to a low level to turn off the transistor M7. The sampling period of the second frame of the image ends.

Step 4: the electrical signal sampled and held in the first sampling unit 5131 and the electrical signal sampled and held in the second sampling unit 5132 are read in the readout time of the second frame.

After sampling two consecutive frames of image, the readout period of the second frame starts. The selection signal SEL of one row rises to a high level to turn on the transistor M3. The sampled signal in the capacitor C1 is amplified and transmitted to the bus, and read by a readout circuit at time T6.

Then the control signal S1 rises to a high level to turn on the transistor M2. The weighted average between the sampled signal in the capacitor C1, which is indicative of an image signal of the second frame, and the sampled signal in the capacitor C2, which is indicative of an image signal of the first frame, is derived based on the sampled signal values and the capacitance value of the capacitors C1 and C2. The signal with the weighted average is transmitted to the bus for reading. In one embodiment, the weighted average signal is read by the readout circuit through the bus at time T7. In this way the thermal noise in the readout signal of the readout circuit can be avoided or decreased. In another embodiment, the control signal S1 first falls to a low level before time T7', and then the weighted averaged signal is read by the readout circuit through the bus at time T7'. In this way the fixed pattern noise in the readout signal of the readout circuit can be avoided or decreased.

After sampling two consecutive frames of the image, the control signals RST and TX rise to a high level to turn on the transfer gate TG and the transistor M1, thus resetting the photodiode PD. After that, the control signal TX may be reduced to a low level to turn off the transfer gate TG, which awaits the start of the exposure of a next frame of the image.

In some embodiments, the image sensor may further include a processor configured to calculate the difference between, or the weighted average of, the image signals of the first frame and the second frame. Through the above mentioned double sampling, the image signal difference between two frames can be determined based on the gain of the transistor M4 and the difference between the sampled signals of the capacitors C1 and C2. As the difference between or the weighted average of, the image signals of two adjacent frames are readily obtainable, the image sensor can be flexibly applied to a rich variety of scenarios.

In the embodiment shown in FIG. 4, the first sampling unit 4131 can be coupled to the sampling switch 4133 directly, which causes output of the weighted average of the signal sampled by the first sampling unit 4131 and the signal sampled by the second sampling unit 4132 when the sampling switch 4133 is turned on during the readout. Then, the final difference signal level between two readouts signals from bus will be the half of the difference between two sampled signals on two sampling unit (C1 and C2), when C1=C2.

Figure 9:
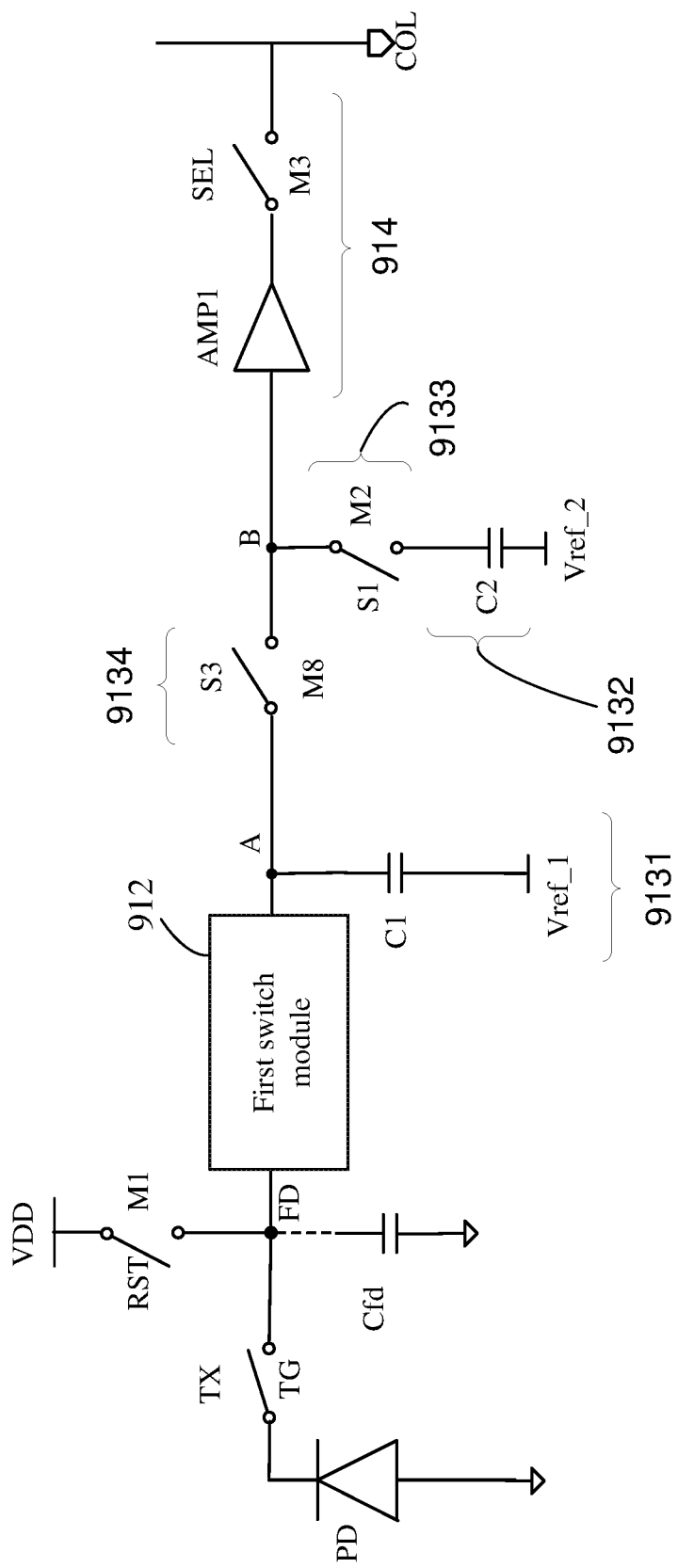
FIG. 9 illustrates another exemplary schematic block diagram of a pixel circuit, in accordance with various embodiments.

FIG. 9 illustrates another exemplary schematic block diagram of a pixel circuit 91, in accordance with various embodiments. As shown in FIG. 9, the sampling switch may be a first sampling switch 9133, and the sampling module 913 may further comprise a second sampling switch 9134 configured to be electrically coupled between the first sampling unit 9131 and the second switch module 914. The second sampling switch 9134 may be provided outside the electrical path between the second sampling unit 9132 and the second switch module 914, thus avoiding the influence of the second sampling switch 9134 on the readout of the second sampling unit 9132. Compared with the related embodiments shown in FIG. 4, with the help of the second sampling switch 9134, not only the sampled electrical signal can be rapidly, directly and completely read out from the bus, but the reference value can also be rapidly, directly and completely readout. The final difference between two different samplings signal levels is increased, as compared with FIG. 1 and FIG. 4. The dynamic range of the sensor can be further increased.

Figure 10:
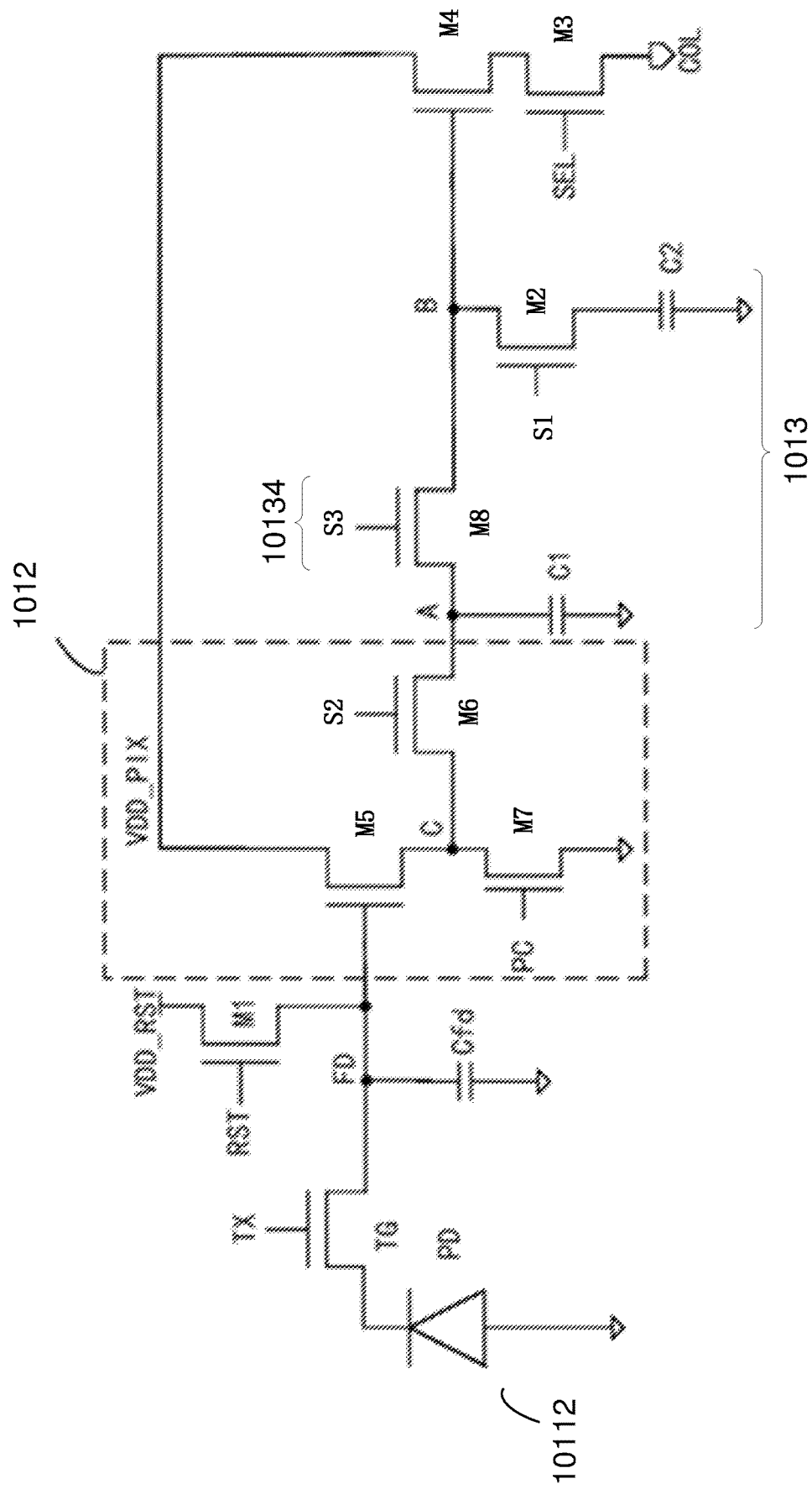
FIG. 10 illustrates yet another exemplary schematic diagram of a pixel circuit, in accordance with various embodiments.

FIG. 10 illustrates another exemplary schematic diagram of a pixel circuit 101, in accordance with various embodiments. The first switch module 1012 shown in FIG. 10 can be the same as the first switch module 512 shown in FIG. 5. The difference between the sampling module 513 shown in FIG. 5 and the sampling module 1013 shown in FIG. 10 is that the sampling module 1013 further includes a second sampling switch 10134 (such as a transistor M8 shown in FIG. 10). The various switches in the pixel circuit 101 shown in FIG. 10 may be implemented by transistors in the pixel circuit 101 shown in FIG. 10 (such as transistors M2, M3, and M8). In some embodiments, the drain/source of the transistor M8 is coupled at conjunction B to the drain/source of the transistor M2 and the gate of the transistor M4. The source/drain of the transistor M8 is coupled at conjunction A to the drain/source of the transistor M6 and the capacitor C1.

In the pixel circuit 101 shown in FIG. 10, the gate of the reset switch M1 is controlled by a control signal RST. The gate of the transfer gate TG is controlled by a control signal TX. The gate of the transistor M2 is controlled by a control signal S1. The gate of the transistor M7 is controlled by a control signal PC. The gate of the transistor M8 is controlled by a control signal S3. The gate of the transistor M6 is controlled by a control signal S2.

Figure 11:
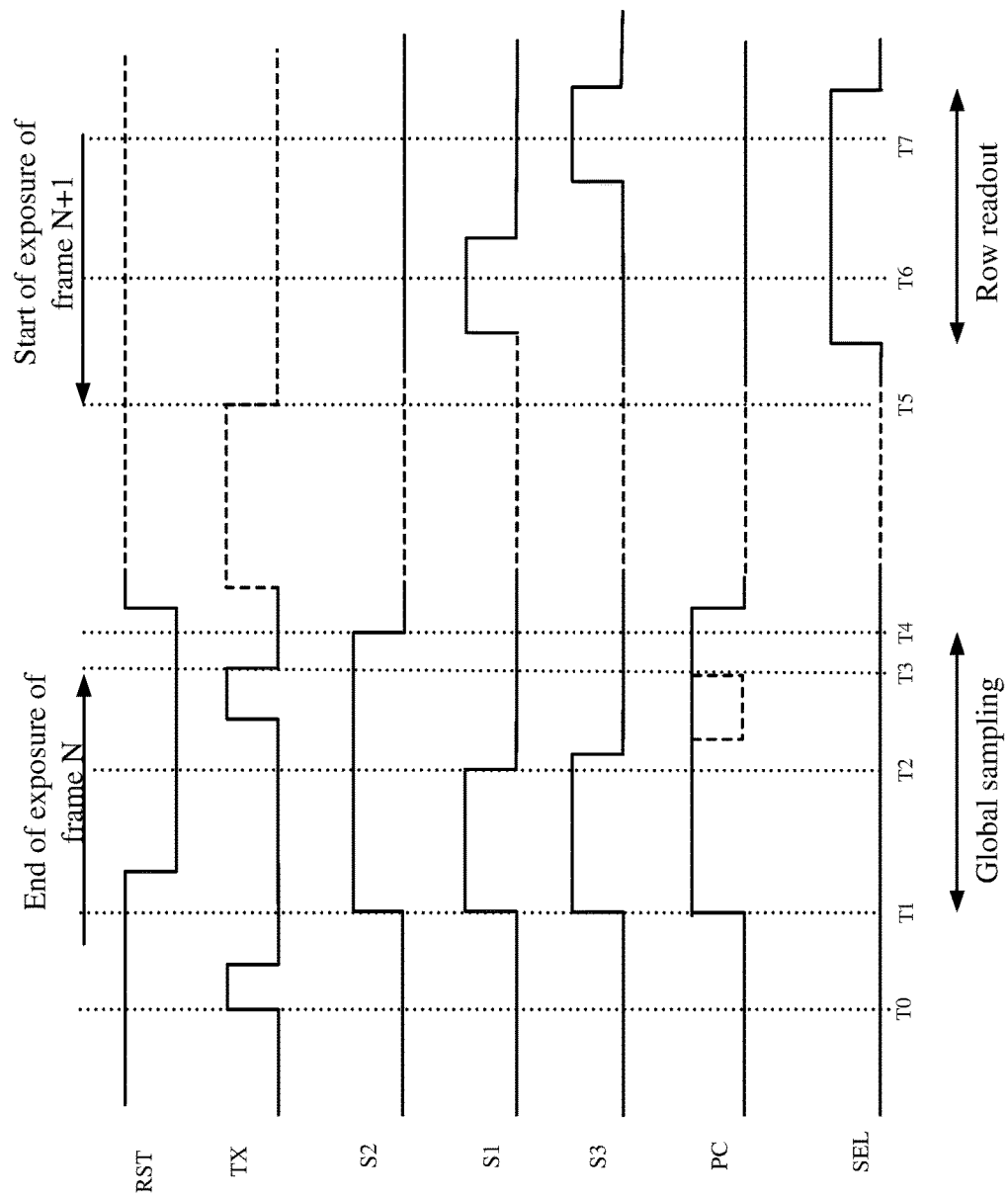
FIG. 11 illustrates an exemplary timing sequence diagram showing a global sampling period and one row readout period of the pixel circuit in FIG. 10, in accordance with various embodiments.

FIG. 11 illustrates an exemplary timing sequence diagram showing a global sampling period and one row readout period of the pixel circuit 101 in FIG. 10, in accordance with various embodiments. In some embodiments, some steps taken by the pixel circuit 101 may be the same as those described in conjunction with FIG. 6, and the timing sequence of control signals RST, TX, S2, S1, PC and SEL in FIG. 6 may be the same as that of control signals RST, TX, S2, S1, PC and SEL in FIG. 11, respectively. Correspondingly, the control signal S3 may rise to a high level to turn on the transistor M8 at time T1 so that the second sampling unit can access the signal coming from the floating node FD. The control signal S3 may fall to a low level to turn off the transistor M8 after time T2. The time T2 is a time point at which the reset voltage Vreset_0 has been sampled and stored in the capacitor C2. The control signal S3 may again rise to a high level to turn on the transistor M8 after the control signal SEL rises to read the sampled electrical signal in the capacitor C1.

Figure 12:
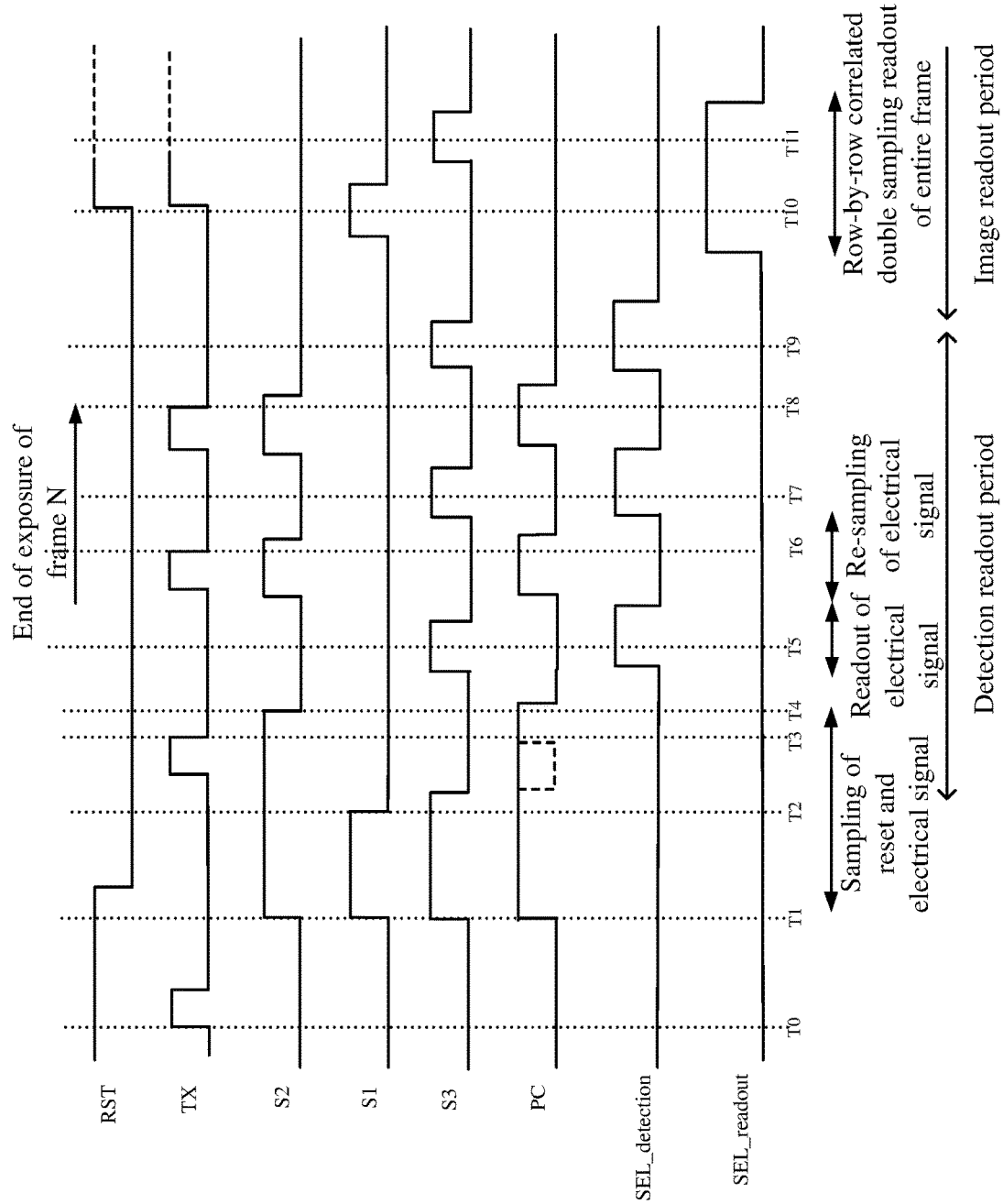
FIG. 12 illustrates another exemplary timing sequence diagram showing a detection signal sample and readout period, and an image signal readout period of the pixel circuit in FIG. 10, in accordance with various embodiments.

FIG. 12 illustrates another exemplary timing sequence diagram showing a detection signal sample and readout period, and an image signal readout period of the pixel circuit 101 in FIG. 10, in accordance with various embodiments. In some embodiments, some steps taken by the pixel circuit 101 may be the same as those described in conjunction with FIG. 7, and the timing sequence of control signals RST, TX, S2, S1, PC, SEL_detection and SEL_readout in FIG. 7 may be the same as that of control signals RST, TX, S2, S1, PC, SEL_detection and SEL_readout in FIG. 12, respectively.

Correspondingly, the control signal S3 may rise to a high level to turn on the transistor M8 at time T1 so that the second sampling unit can access the signal coming from the floating node FD. The control signal S3 may fall to a low level to turn off the transistor M8 after time T2. The time T2 is the time point at which the reset voltage Vreset_0 has been sampled and stored in the capacitor C2. The control signal S3 may again rise to a high level to turn on the transistor M8 each time the control signal SEL_detection or SEL_readout rises to read the sampled electrical signal in the capacitor C1.

Figure 13:
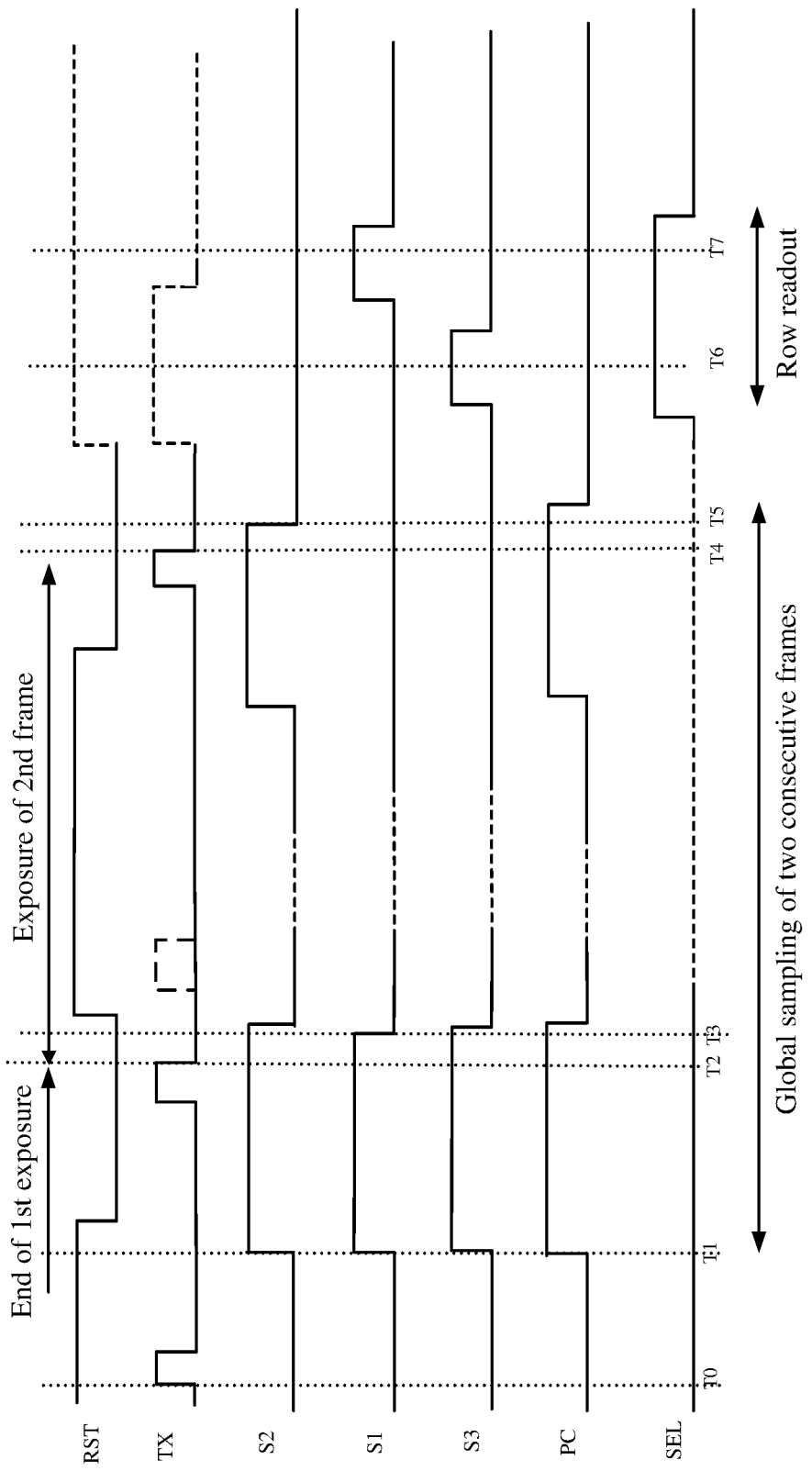
FIG. 13 illustrates yet another exemplary timing sequence diagram showing a global sampling operation and one row readout period of the pixel circuit in FIG. 10 within two adjacent frames, in accordance with various embodiments.

FIG. 13 illustrates another exemplary timing sequence diagram showing a global sampling operation and one row readout period of the pixel circuit 101 in FIG. 10 within two adjacent frames, in accordance with various embodiments. In some embodiments, some steps taken by the pixel circuit 101 may be the same as those described in conjunction with FIG. 8, and the timing sequence of control signals RST, TX, S2, S1, PC and SEL in FIG. 8 may be the same as that of control signals RST, TX, S2, S1, PC and SEL in FIG. 13, respectively. Correspondingly, the control signal S3 may rise to a high level to turn on the transistor M8 at time T1 so that the second sampling unit can access the signal coming from the floating node FD. The control signal S3 may fall to a low level to turn off the transistor M8 after time T3. The time T3 is the time point at which electrical signal of the first frame from the photosensitive unit 10112 is sampled and stored in the capacitor C2. The control signal S3 may again rise to a high level to turn on the transistor M8 when the control signal SEL rises to read the sampled second frame signal in the capacitor C1.

In some embodiments, the control signal S3 can fall to a low level to turn off the transistor M8 before the readout of the electrical signal of the first frame from the photosensitive unit 10112, which is sampled and held in the capacitor C2. Therefore, when the control signal S1 again rises back to a high level to turn on the transistor M2, the electrical signal sampled in the capacitor C1 can be read instead as the weighted average of the electrical signals sampled in the capacitors C1 and C2. Therefore, the image signals of two frames, the difference between the image signals of two frames, or the weighted average of the image signals of two frames can be readily obtained. Thus, the image sensor according to the present disclosure can be flexibly applied to a rich variety of scenarios.

In the readout period, the sequence of reading the electrical signals respectively sampled and held in the capacitor C1 and C2 can be exchanged in the readout time as needed by adjusting on/off of the second sampling switch M8 and the first sampling switch M2. The exchange of sequence can be realized by switching the high level timing between control signals S3 and S1 with respect to the time T6 and the time T7 in FIG. 13. Once switched, control signal S1 will turn on the transistor M2 first at time T6 and cause the electrical signal stored in the capacitor C2 be read out first, while control signal S3 will thereafter turn on the transistor M8 at time T7 and let the electrical signal stored in the capacitor C1 be read out.

In some embodiments, the first switch module, such as the first switch module 312 shown in FIG. 3, can have other structures. For example, the first switch module may include a second amplifier, a second load transistor and a second sampling transistor. In some embodiments, the second amplifier may be the second source follower. The input of the second source follower can be coupled to the source module, and the output of the second source follower can be coupled to a first terminal of the second sampling transistor. A second terminal of the second sampling transistor can be coupled to the sampling module and the first terminal of the second load transistor. A second terminal of the second load transistor can be grounded.

Figure 14:
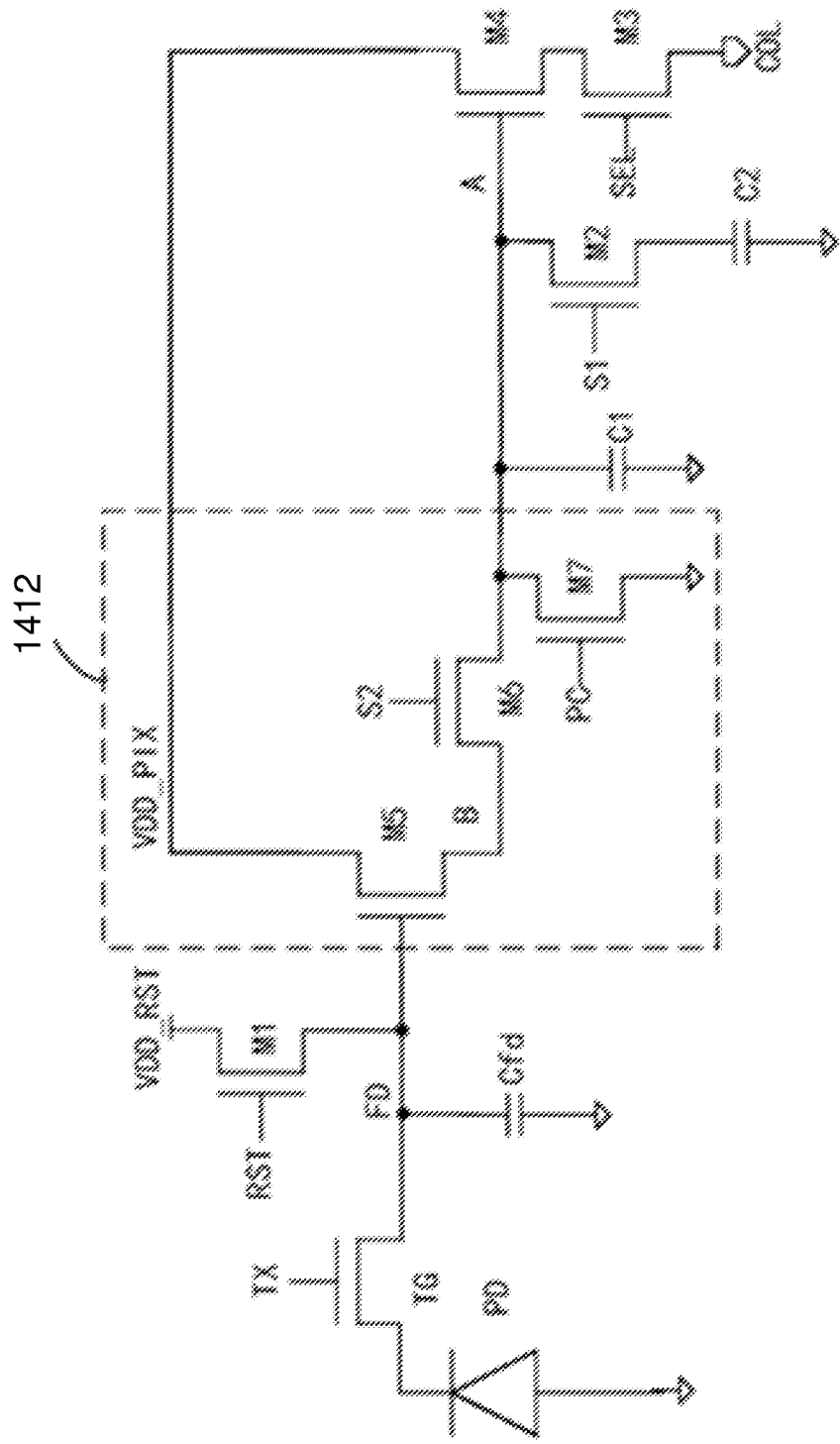
FIG. 14 illustrates yet another exemplary schematic diagram of a pixel circuit, in accordance with various embodiments.

FIG. 14 illustrates another exemplary schematic diagram of a pixel circuit 141, in accordance with various embodiments. The difference between the pixel circuits 51 and 141, shown in FIG. 5 and in FIG. 14 respectively, is the location of the transistor M7 in the first switch modules 512 and 1412. As shown in FIG. 14, the source of the transistor M7 is coupled to the power ground. The drain/source of the transistor M6, the drain of the transistor M7, the capacitor C1 and the drain/source of the transistor M2 are all connected at one same node (node A in FIG. 14). The gate of the transistor M6 is controlled by the control signal S2.

Figure 15:
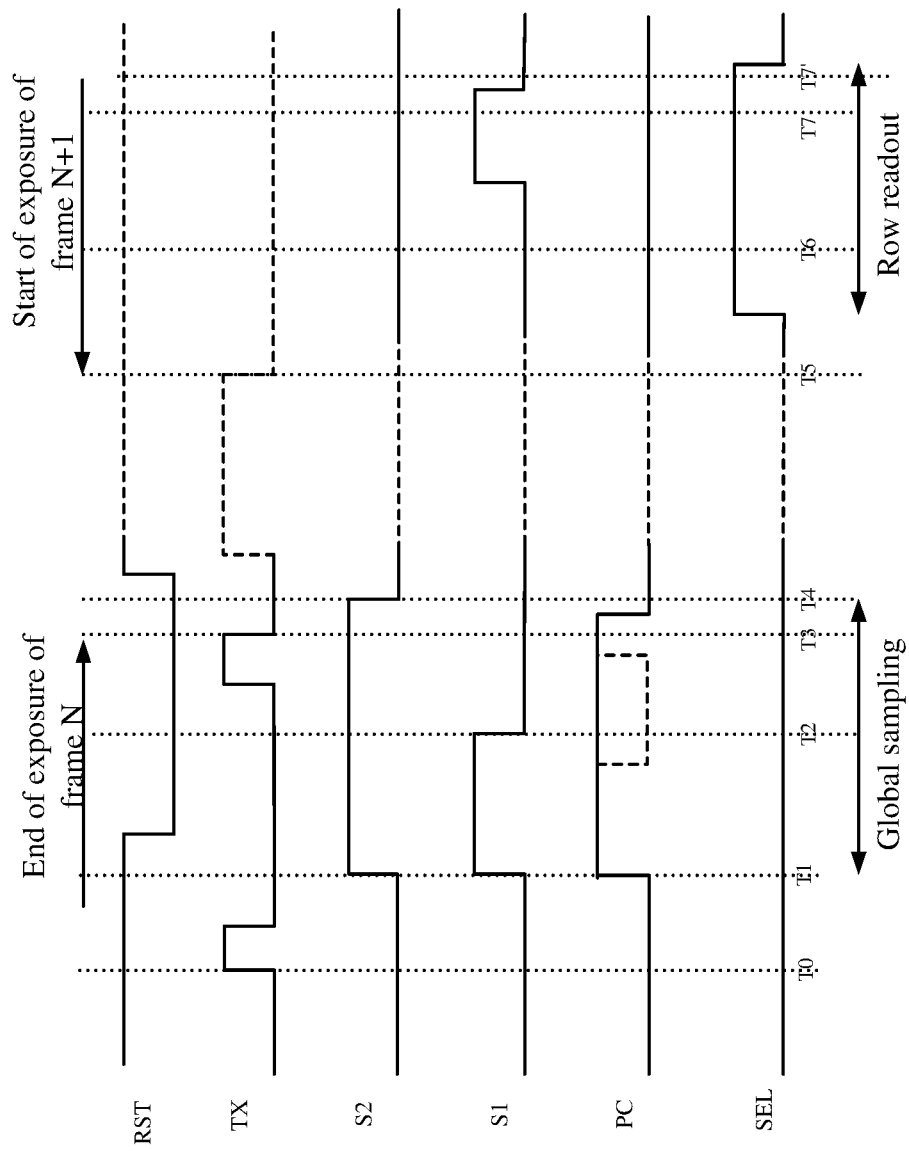
FIG. 15 illustrates an exemplary timing sequence diagram showing a global sampling period and one row readout period of the pixel circuit in FIG. 14, in accordance with various embodiments.

FIG. 15 illustrates an exemplary timing sequence diagram showing a global sampling period and one row readout period of the pixel circuit 141 in FIG. 14, in accordance with various embodiments. The timing sequence diagram in FIG. 15 is basically the same as that described in FIG. 6. The main difference is that the control signal PC may have to change from a high level to a low level to turn off the transistor M7 before the transistor M6 is turned off at time T4. The signal sampled in capacitor C1 will be discharged and reset by the transistor M7 if the transistor M6 is switched off and the transistor M7 remains turned on.

In another example, the first switch module may include a third source follower and a third sampling transistor. The input of the third source follower may be coupled to the source module, the source terminal of the third source follower may be coupled to a pulsed power supply, and the output of the third source follower may be coupled to a first terminal of the third sampling transistor. A second terminal of the third sampling transistor may be coupled to the sampling module.

Figure 16:
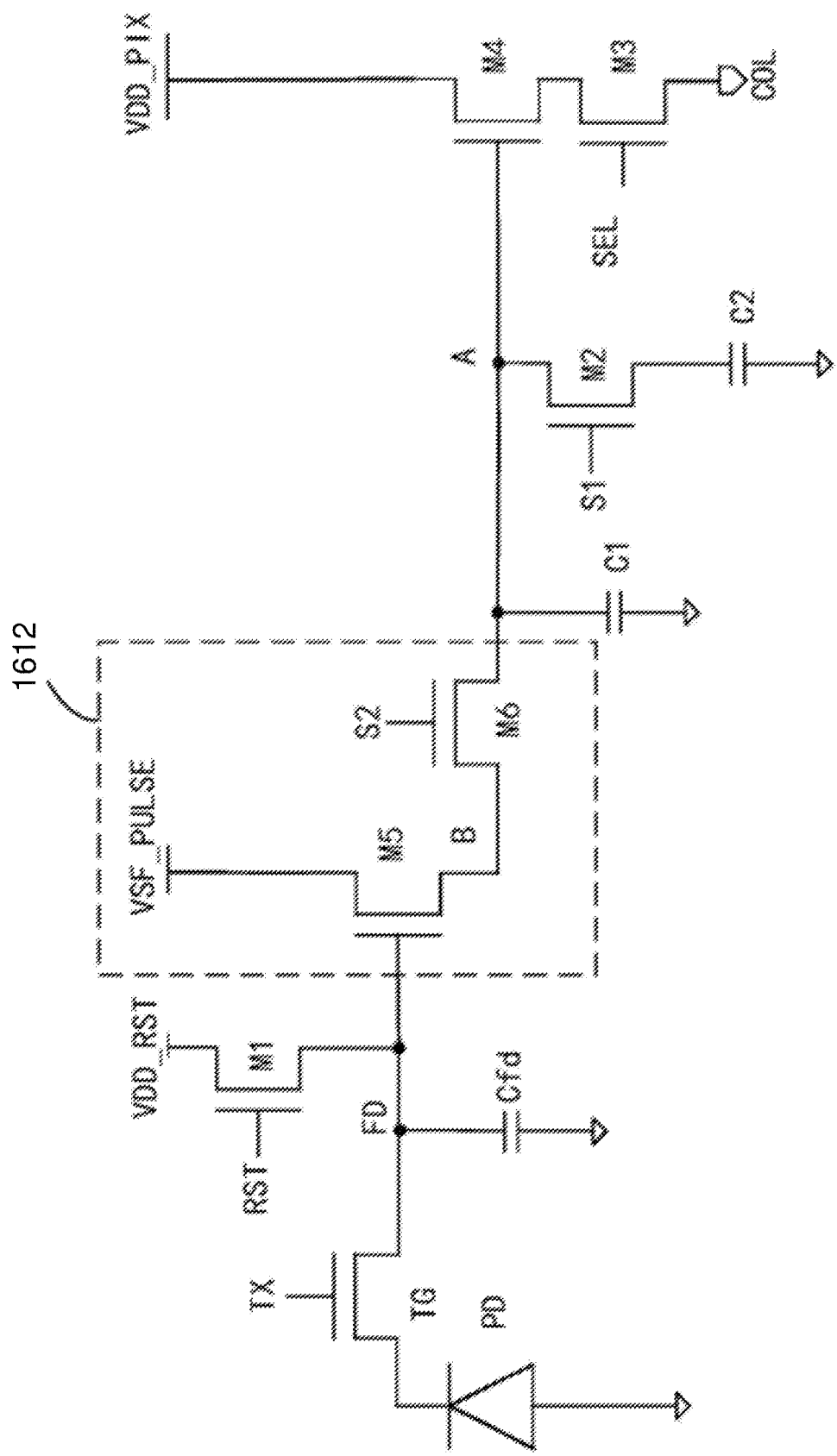
FIG. 16 illustrates yet another exemplary schematic diagram of a pixel circuit, in accordance with various embodiments.

FIG. 16 illustrates another exemplary schematic diagram of a pixel circuit 161, in accordance with various embodiments. The main difference between the pixel circuit 161 and other pixel circuits described herein (such as the pixel circuits 51, 101, and 141) is that the transistor M7 is not provided in FIG. 16, and the drain of the transistor M5 (the third source follower) is coupled to a pulsed power supply to replace the power supply. The function of the transistor M7 in FIG. 5 may be replaced by the pulsed power supply in order to complete the conversion between two states (charge and discharge) of the sampling module. The second power source VDD_PIX connected to the drain of the transistor M5, as shown in FIG. 5, is replaced with a variable voltage source VSF_PULSE, as shown in FIG. 7. This implementation may save one transistor, and thus achieving a more compact and simplified design. Same as the previous embodiments, the first power supply VDD_RST coupled to the drain of the transistor M1 may be independent or may be coupled to the same power supply VDD_PIX that is coupled to the transistor M4.

Figure 17:
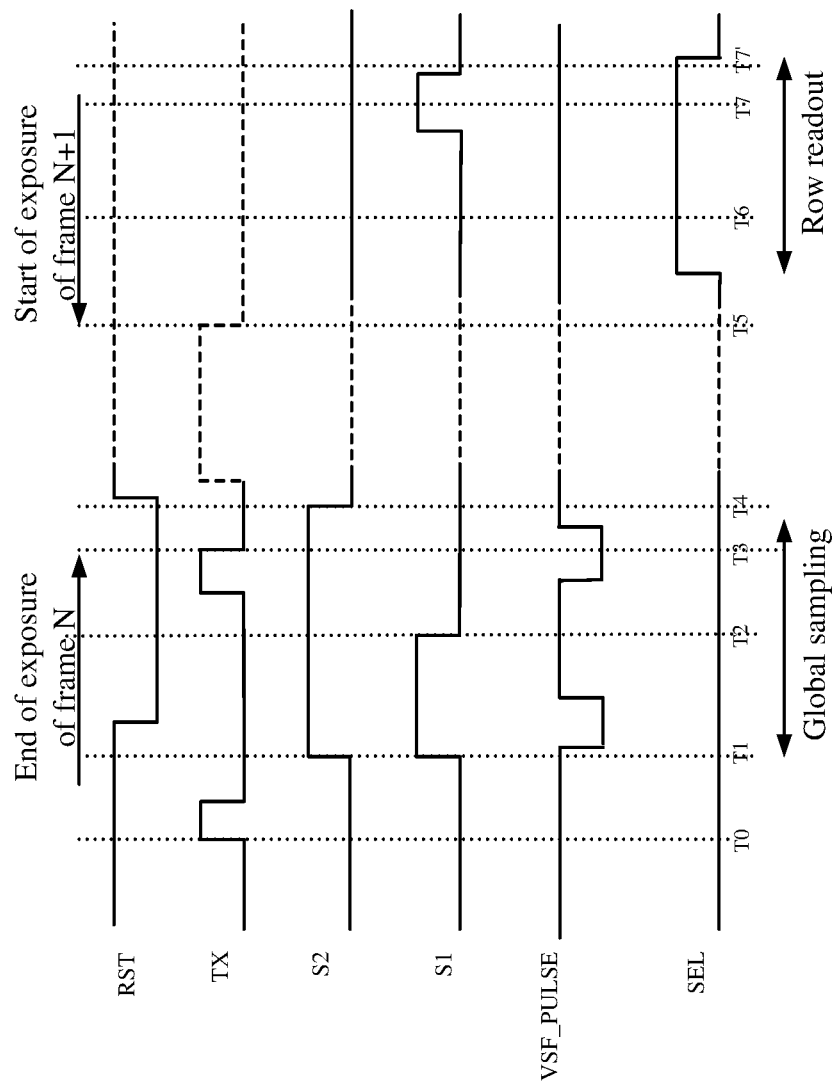
FIG. 17 illustrates an exemplary timing sequence diagram showing a global sampling period and one row readout period of the pixel circuit in FIG. 16, in accordance with various embodiments.

FIG. 17 illustrates an exemplary timing sequence diagram showing a global sampling period and one row readout period of the pixel circuit 161 in FIG. 16, in accordance with various embodiments. The timing sequence diagram in FIG. 17 is basically the same as that described in FIG. 6. The main difference is that the signal timing of the pulsed voltage source VSF_PULSE replaces that of the control signal PC. The pulsed power supply VSF_PULSE needs to fall from a high level to a low level and then recovery to a high level twice in the sampling period. The first falling of the pulsed voltage source VSF_PULSE in the global sampling period of each frame may be at a timing when the control signal RST is at a high level after time T1, or after the control signal RST falls to a low level. Before time T2, the floating node FD is reset, the pulsed voltage source VSF_PULSE falls to a low level, and the first terminal (node A) and the second terminal (node B) are pulled to a low level corresponding to the pulsed power supply VSF_PULSE level. Thus, the capacitors C1 and C2 are reset. Similarly, before time T2, the pulsed power supply VSF_PULSE is restored to a high level, and the working state of the transistor M5 reverts to the source follower state. The transistor M2 is turned off at time T2. The reset signal has been sampled and held in the capacitor C2 since time T2. Before sampling by the capacitor C1 at time T4, the pulsed power supply VSF_PULSE needs to fall to a low level again, and then rise to a high level again, which causes the second terminal (node B) to reset and be ready to begin sampling of the electrical signal.

As mentioned above, the present disclosure is not limited to the above-mentioned embodiments. For example, the respective second terminals of the capacitor C1 and the capacitor C2 may be coupled to the power ground as shown in the above figures, or be coupled to the power signal or other suitable fixed potential reference points. The amplifiers in the first switch module and the amplifier AMP1 mentioned above may adopt the source follower mentioned in the several embodiments above, or adopt other types of amplifier implementations. The transistors described above may be NMOS transistors or other types of switch, such as CMOS transmission gate switches. The control signal PC may be shown as the solid lines or the dotted lines in the above example figures of the timing sequence. All the different configurations of the first switch module (e.g., 512, 1412, and 1612) could be combined with different sampling switches (e.g., 513, and 1013).

The pixel circuit designs proposed in the present disclosure can be compatible with image sensors manufactured using one or more semiconductor fabrication processes that lead to sensors having frontside illumination, backside illumination or 3D stacking structure.

Figure 18:
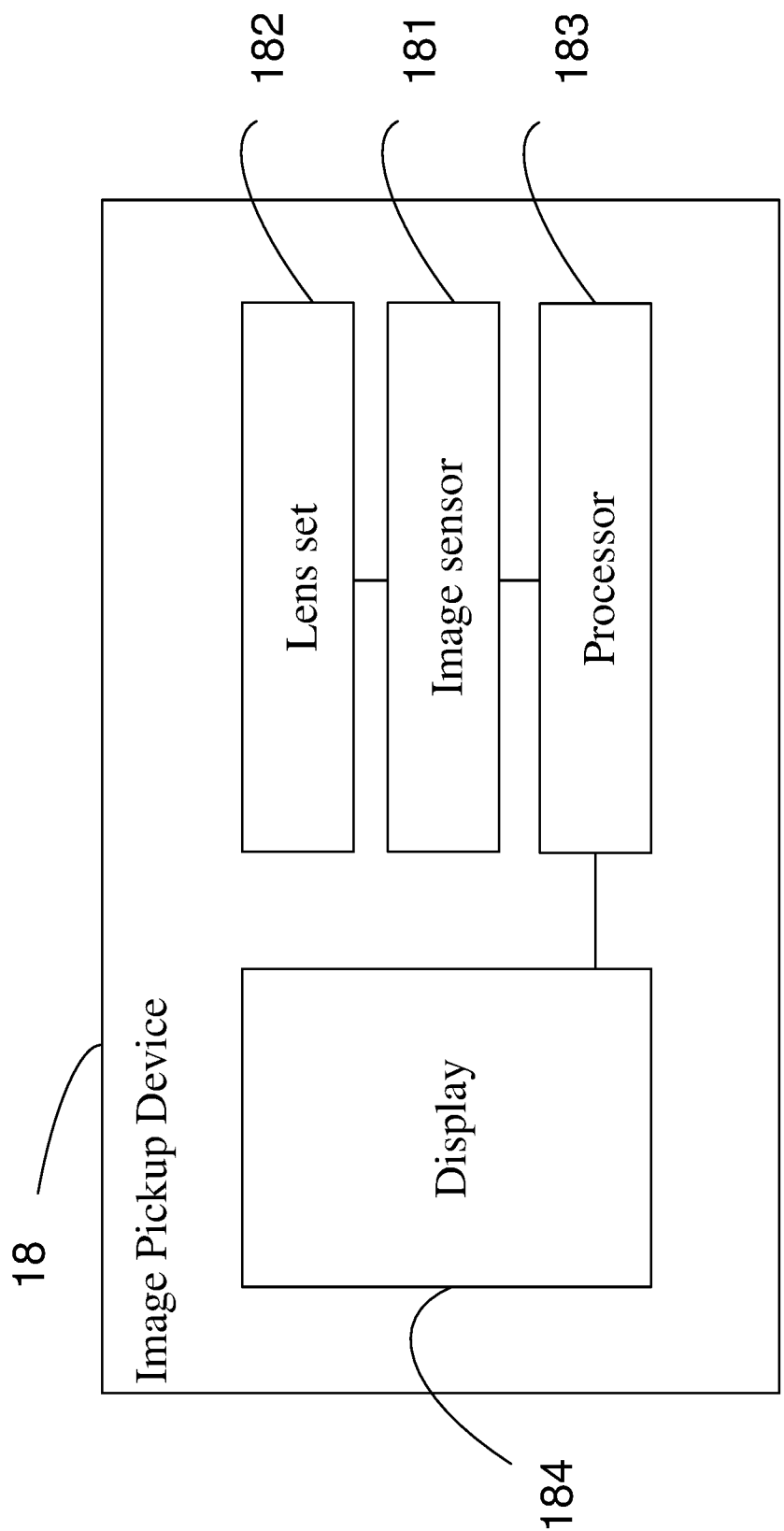
FIG. 18 illustrates an exemplary schematic diagram of an image pickup device, in accordance with various embodiments.

The present disclosure further provides an image pickup device including an image sensor described above. The image pickup device can be a still camera, a video camera, a camera integrated with cellphones, wearable devices, computers, IoT appliances, etc. FIG. 18 illustrates an exemplary schematic diagram of an image pickup device 18, in accordance with various embodiments. The image pickup device 18 may comprise an image sensor 181, a lens set 182, a processor 183 and a display 184. The image sensor 181 may detect photons and generate electrical signals from the detected photons. The image sensor 181 can be any image sensor described above. The lens set 182 may be located in front of the image sensor 181 towards the incoming direction of incident light, thus focusing the incident light to the image sensor 181. The lens set 182 may be composed of a plurality of lenses. Some of the plurality of lenses may be convex lenses while others may be concave lenses. The processor 183 may be operably coupled to the image sensor 181, and process the generated electrical signals output by the image sensor 181 in order to generate one or more images. The display 184 may illustrate the generated images to a user of the image pickup device.

Although only singular form of each component of the image pickup device is used in the above description, it is understood that each component may be composed of a plurality of the same or similar components. For example, the image sensor 181 may include one or more image sensors. The lens set 182 may include one or more lens sets. The processor 183 may include one or more processors. The display 184 may include one or more displays.

Figure 19:
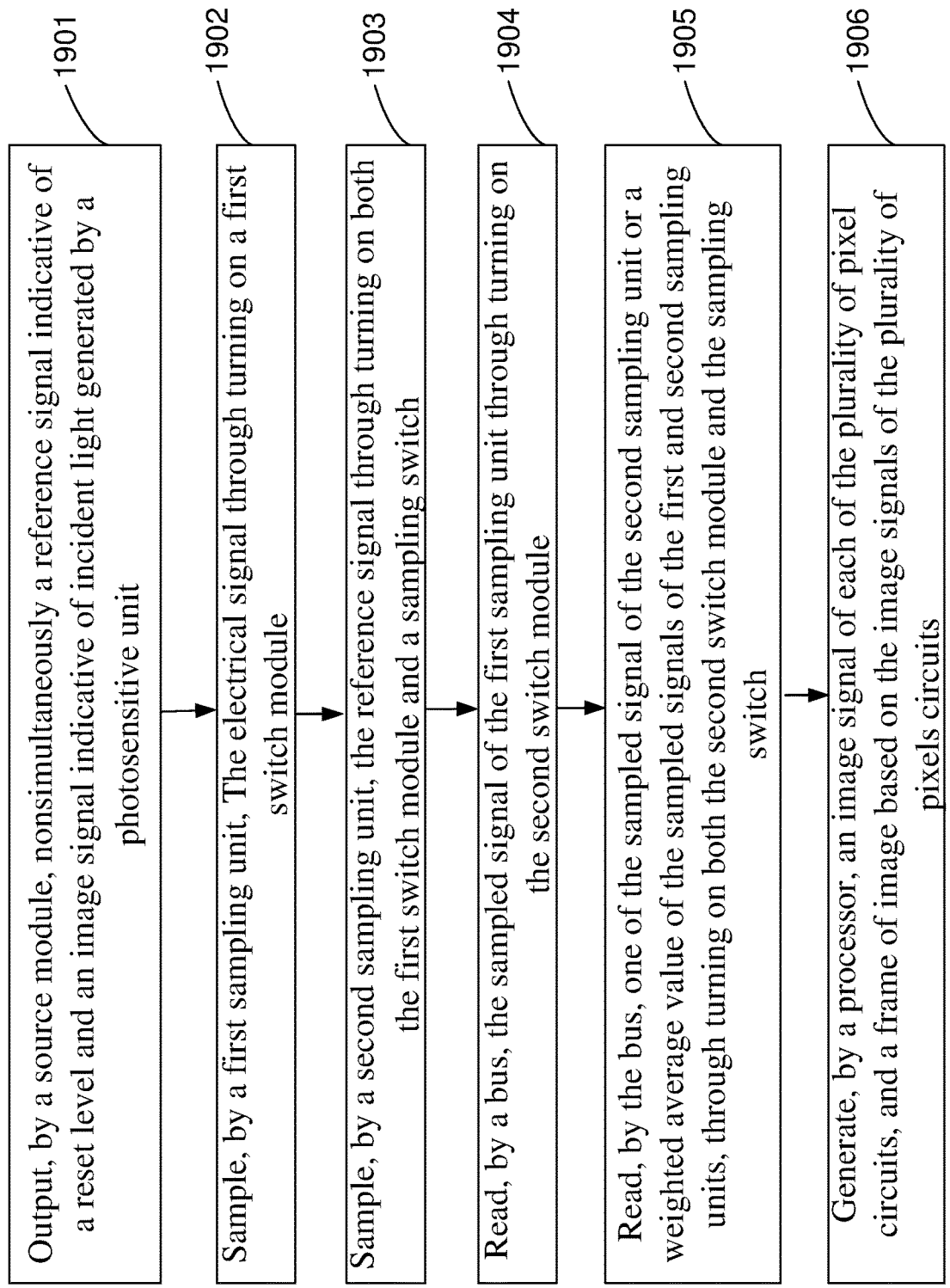
FIG. 19 illustrates an exemplary flowchart showing a method of capturing images, in accordance with various embodiments.

The present disclosure further provides a method of capturing images by an image sensor described above. FIG. 19 illustrates an exemplary flowchart showing a method 1900 of capturing images, in accordance with various embodiments. It is to be appreciated that some of the steps may be optional to perform the disclosure provided herein, and that some steps may be inserted in the flowchart of the method 1900 that are consistent with other embodiments according to the current disclosure. Further, some of the steps may be performed simultaneously, or in an order different from that shown in FIG. 19.

In some embodiments, the image sensor may include a plurality of pixel circuits and buses. Each of the pixel circuits may include a source module, a sampling module, a first switch module electrically coupled between the source module and the sampling module, and a second switch module electrically coupled between the sampling module and a bus. The source module may include a photosensitive unit and a reset unit configured to reset the photosensitive unit. The sampling module may include a first sampling unit, a second sampling unit and a sampling switch, and the second sampling may be electrically coupled to the first switch module and the second switch module by a sampling switch. The pixel circuits consistent with the methods herein can be any pixel circuit described in conjunction with the above figures. For example, the details of pixel circuits may be similar to the pixel circuits described in conjunction with FIGS. 3-5, 14 and 16.

In some embodiments, the source module further comprises a memory element, a transfer switch. The memory element may output non-simultaneously the reference signal and the electrical signal. The transfer switch may be electrically coupled between the photosensitive unit and the memory element, and the reset switch may comprise a reset unit configured to be electrically coupled with the memory element.

In some embodiments, the first capacitor may be coupled between the first switch module and a first reference voltage. The second capacitor may be coupled between the sampling switch and a second reference voltage. The first reference voltage and the second reference voltage may be the same.

In some embodiments, the structure of the first switch module may be similar to the first switch module described in conjunction with FIGS. 5, 14 and 16.

At step 1901, the source module outputs non-simultaneously a reference signal indicative of a reset level and an image signal indicative of incident light received by the photosensitive unit.

At step 1902, the first sampling unit samples the image signal through turning on the first switch module.

At step 1903, the second sampling unit samples the reference signal through turning on both the first switch module and the sampling switch.

At step 1904, the bus reads the sampled signal of the first sampling unit through turning on the second switch module.

At step 1905, the bus reads one of the sampled signal of the second sampling unit or a weighted average value of the sampled signals of the first and second sampling units, through turning on both the second switch module and the sampling switch.

In some embodiments, the image sensor further comprises a processor. The method may further include a step 1906. At step 1906, the processor may generate an image signal of each of the plurality of pixel circuits, and generate a frame of image based on the image signals of the plurality of pixels circuits.

According to the present disclosure, the reference signal and the electrical signal from the source module may be sampled by different sampling units. Due to the sampling switch, the mutual influence between the first sampling unit and the second sampling unit during sampling from the source module and outputting signals to the bus can be reduced or eliminated by turning on or off the sampling switch.

In some embodiments, at step 1905, the bus may read the weighted average value of the sampled signals of the first and second sampling units when turning on both the second switch module and the sampling switch. The second sampling unit may sample the reference signal before the end of exposure period of a frame, and the first sampling unit may sample the electrical signal within the frame and after the exposure period of the frame. The details of the method may be similar to the steps taken by the pixel circuits described above, such as the steps described in conjunction with FIGS. 6-8, 15 and 17.

In some embodiments, at step 1905, the bus may read the sampled signal of the second sampling unit when turning on both the second switch module and the sampling switch. For example, the sampling switch may be a first sampling switch, and the sampling module further comprises a second sampling switch configured to be electrically coupled between the first sampling unit and the second switch module. The second sampling switch may be provided outside the electrical path between the second sampling unit and the second switch module. For example, the details of pixel circuits may be similar to the pixel circuits described above, such as the pixel circuits in conjunction with FIGS. 9-10. The details of the method may be similar to the steps taken by the pixel circuits described above, such as the steps described in conjunction with FIGS. 11-13.

In some embodiments, at step 1905 taken by the pixel circuit with the second sampling switch, the second sampling switch may be turned off when the bus reads out the sampled signal of the second sampling unit.

Furthermore, at step 1903 taken by the pixel circuit with the second sampling switch, the second sampling switch may be turned on when the second sampling unit samples the reference signal. At step 1904 taken by the pixel circuit with the second sampling switch, the second sampling switch may be turned on when the bus reads the sampled signal of the first sampling unit.

In some embodiments, the sampled signal of the second sampling unit may be saved to a next frame due to the sampling switch coupled with the second sampling unit. For example, the method further include sampling, by the second sampling unit, the electrical signal through turning on both the first switch module and the sampling switch. The sampled signal of the first sampling unit and the sampled signal of the second sampling unit may be from different frames and read within the readout period of the same frame.

For example, the second sampling unit may sample the electrical signal of a first frame from the photosensitive unit, which may be saved to be read in the readout time of a second frame next to the first frame. The first sampling unit may sample the electrical signal of the second frame from the photosensitive unit. The electrical signal of the first frame stored in the second sampling unit and the electrical signal of the second frame stored in the first sampling unit can be both read in the readout time of the second frame.

For example, the second sampling unit may sample an electrical signal from a first frame through turning on both the first switch module, the first sampling switch and the second sampling switch. For example, the first sampling unit may sample an electrical signal from a second frame through turning on both the first switch module, wherein the first frame is previous to the second frame. For example, the bus may read the sampled signal of the first sampling unit through turning on the second switch module and the second sampling switch within the readout period of the second frame. For example, the bus may read the sampled signal of the second sampling unit through turning on the second switch module and the first sampling switch within the readout period of the second frame.

In some embodiments, the method may further include calculating, by the processor, the difference between the two frames or the weighted average of the two frames based on the sampled signal of the first sampling unit and the sampled signal of the second sampling unit. The details of the method may be similar to the steps taken by the pixel circuits described above, such as the steps described in conjunction with FIGS. 6 and 11.

In some embodiments, the method may further include reading, by the bus, the sampled signal of the first sampling unit one or more times during the exposure time of one frame, and finishing sampling, by the first sampling unit, the electrical signal when the current sampled electrical signal of the first sampling unit reaches a predetermined criterion. The details of the method may be similar to the steps taken by the pixel circuits described above, such as the steps described in conjunction with FIGS. 7 and 12.

The foregoing description of the specific embodiments will so reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way.

Various functional blocks, modules, and steps are disclosed above. The particular arrangements provided are illustrative and without limitation. Accordingly, the functional blocks, modules, and steps may be re-ordered or combined in different ways than in the examples provided above. Likewise, certain embodiments include only a subset of the functional blocks, modules, and steps, and any such subset is permitted.

The breadth and scope of the present disclosure should not be limited by any of the above-described exemplary embodiments, but should be defined only in accordance with the following claims and their equivalents.

What is claimed is:

1. A pixel circuit, comprising:
a source module, comprising a photosensitive unit and a reset unit configured to reset the photosensitive unit, wherein the source module is configured to output non-simultaneously a reference signal indicative of a reset level and an electrical signal indicative of incident light received by the photosensitive unit,
a sampling module, comprising a first sampling unit, a second sampling unit and a sampling switch,
a first switch module configured to be electrically coupled between the source module and the sampling module,
a second switch module configured to be electrically coupled between the sampling module and a bus,
wherein the first sampling unit is configured to be electrically coupled to the first switch module and the second switch module, the second sampling unit is configured to be electrically coupled to the first switch module and the second switch module by the sampling switch, and the first sampling unit and the second sampling unit are configured to sample and store the signals from the source modules individually,
wherein the first sampling unit comprises a first capacitor that is directly coupled with the first switch module and a first reference voltage, respectively, and the second sampling unit comprises a second capacitor coupled between the sampling switch and a second reference voltage, and
wherein the sampling switch is provided outside an electrical path between the first sampling unit and the first switch module, and/or outside an electrical path between the first sampling unit and the second switch module.

2. The pixel circuit of claim 1, wherein the first sampling unit is configured to sample the electrical signal or the reference signal by pulsing the first switch module from on to off at a first time point, and is further configured to output the sampled signal to the bus when the second switch module is turned on at a second time point.

3. The pixel circuit of claim 2, wherein the sampling switch is configured to remain being turned off at the second time point,
wherein the second sampling unit is configured to sample the electrical signal or reference signal by pulsing the sampling switch from on to off, and the first switch module remains turned on at a third time point, and
wherein the second sampling unit is further configured to connect with the first sampling unit when the second switch module is turned on after the third time point, so that a weighted average value of the sampled signals in first sampling unit and the second sampling unit is output to the bus when the second switch module and the sampling switch are both turned on at a fourth time point.

4. The pixel circuit of claim 2, wherein the second sampling unit is configured to sample the electrical signal at a third time point of a first frame,
wherein the first sampling unit is configured to sample the electrical signal at the first time point of a second frame, and
wherein the first sampled unit is configured to output the electrical signal of the second frame when the second switch module is turned on, and the sampling switch remains turned off, and
wherein the second sampling unit is further configured to connect with the first sampling unit when the second switch module is turned on to output a weighted average value of the two electrical signals from the first frame and the second frame to the bus when the second switch module and the sampling switch are both turned on in a readout period of the second frame.

5. The pixel circuit of claim 2, wherein the sampling switch is a first sampling switch,
wherein the sampling module further comprises a second sampling switch configured to be electrically coupled between the first sampling unit and the second switch module, and
wherein the second sampling switch is provided outside an electrical path between the second sampling unit and the second switch module.

6. The pixel circuit of claim 5, wherein the second sampling switch is configured to be turned on when the referenced signal or the electrical signal sampled and held in the first sampling unit is readout, and
wherein the second sampling unit is configured to sample the reference signal or the electrical signal by pulsing one of the first sampling switch and the second sampling switch from on to off at a fifth time point, and the other sampling switch and the first switch module remain turned on at a fifth time point.

7. The pixel circuit of claim 5, wherein the second sampling unit is further configured to output the sampled signal to the bus when the second switch module and the first sampling switch are both turned on at a sixth time point, and
wherein the second sampling switch is configured to be turned off at the sixth time point.

8. The pixel circuit of claim 5, wherein the second sampling unit is configured to sample the electrical signal at a fifth time point of a first frame,
the first sampling unit is configured to sample the electrical signal at the first time point of a second frame, and
the first sampling unit and the second sampling unit are configured to output the two sampled electrical signals respectively in the readout period of the second frame.

9. The pixel circuit of claim 5, wherein the second sampling unit is configured to sample the reference signal at a fifth time point, and output the sampled reference signal to the bus within one frame, and
wherein the first sampling unit is configured to sample the electrical signal at the first time point within the frame.

10. The pixel circuit of claim 2, wherein the sampled signal of the first sampling unit is read one or more times during the exposure time of one frame, and the first sampling unit is configured to stop sampling the electrical signal when a current sampled electrical signal reaches a predetermined criterion.

11. The pixel circuit of claim 1, wherein the source module further comprises:
a memory element, configured to store the reference signal and the electrical signal for non-simultaneous output before sampling, and configured to be electrically coupled between a floating node and ground,
a transfer switch, configured to be electrically coupled between the photosensitive unit and the memory element, and a reset switch, configured to be electrically coupled between reference power supply and the memory element, said reset switch being included in a reset unit, and the reset unit contains one or more reset switches.

12. The pixel circuit of claim 1, wherein the first switch module comprises a first source follower, a first load transistor and a first sampling transistor,
   wherein input of the first source follower is coupled to the source module, and output of the first source follower is coupled between a first terminal of the first load transistor and a first terminal of the first sampling transistor,
   wherein a second terminal of the first load transistor is grounded, and
   wherein a second terminal of the first sampling transistor is coupled to the sampling module.

13. The pixel circuit of claim 1, wherein the first switch module comprises a second source follower, a second load transistor and a second sampling transistor,
   wherein the input of the second source follower is coupled to the source module, and the output of the second source follower is coupled to a first terminal of the second sampling transistor,
   wherein a second terminal of the second sampling transistor is coupled between the sampling module and the first terminal of the second load transistor, and
   wherein a second terminal of the second load transistor is grounded.

14. The pixel circuit of claim 1, wherein the first switch module comprises a third source follower and a third sampling transistor,
   wherein the input of the third source follower is coupled to the source module, a source terminal of the third source follower is coupled to a pulsed power supply, and the output of the third source follower is coupled to a first terminal of the third sampling transistor, and
   wherein a second terminal of the third sampling transistor is coupled to the sampling module.

15. An image sensor comprising:
   a plurality of pixel circuits configured to convert incident light to electrical signals,
   a timing controller, configured to control the timing of exposure and readout of the plurality of pixel circuits,
   one or more buses coupled to the plurality of pixel circuits, and
   one or more readout circuits coupled to the buses and, configured to read the electrical signals through the buses and to generate image signals indicative of the incident light based on the electrical signals,
   wherein the pixel circuit comprises:
      a source module, comprising a photosensitive unit and a reset unit configured to reset the photosensitive unit, wherein the source module is configured to output non-simultaneously a reference signal indicative of a reset level and an electrical signal indicative of incident light received by the photosensitive unit,
      a sampling module, comprising a first sampling unit, a second sampling unit and a sampling switch,
      a first switch module configured to be electrically coupled between the source module and the sampling module,
      a second switch module configured to be electrically coupled between the sampling module and a bus,
      wherein the first sampling unit is configured to be electrically coupled to the first switch module and the second switch module, the second sampling unit is configured to be electrically coupled to the first switch module and the second switch module by the sampling switch, and the first sampling unit and the second sampling unit are configured to sample and store the signals from the source modules individually,
      wherein the first sampling unit comprises a first capacitor that is directly coupled with the first switch module and a first reference voltage, respectively, and the second sampling unit comprises a second capacitor coupled between the sampling switch and a second reference voltage, and
      wherein the sampling switch is provided outside an electrical path between the first sampling unit and the first switch module, and/or outside an electrical path between the first sampling unit and the second switch module.

16. The image sensor of claim 15, wherein the plurality of pixel circuits comprise a first pixel circuit,
   wherein the timing controller is configured to control a readout circuit to read the sampled electrical signal of the first sampling unit in the first pixel circuit one or more times during exposure time of one frame,
   wherein the timing controller is further configured to control the first sampling unit in the first pixel circuit to stop sampling the electrical signal when the current sampled electrical signal reaches a predetermined criterion, and
   wherein the readout circuit is further configured to read final sampled electrical signals of the first sampling units in the plurality of pixel circuits.

17. The image sensor of claim 15, wherein one or more readout circuits are further configured to read sampled reference signals or electrical signals from the first sampling units of the plurality of pixel circuits as a first readout signal, and read sampled reference signals or electrical signals from the second sampling units of the plurality of pixel circuits or weighted average of the two sampled signals as the second readout signal, and
   wherein the image sensor is further configured to calculate and output difference between the first readout signal and the second readout signal based on the readout of the readout circuit.

18. A method of capturing images by an image sensor comprising a plurality of pixel circuits and buses,
   wherein each of the plurality of pixel circuits comprises a source module, a sampling module, a first switch module configured to be electrically coupled between the source module and the sampling module, and a second switch module configured to be electrically coupled between the sampling module and one of the buses,
   wherein the source module comprises a photosensitive unit and a reset unit configured to reset the photosensitive unit,
   wherein the sampling module comprises a first sampling unit, a second sampling unit and a sampling switch, and wherein the second sampling unit is configured to electrically couple to the first switch module and the second switch module by the sampling switch,
   wherein the first sampling unit comprises a first capacitor that is directly coupled with the first switch module and a first reference voltage, respectively, and the second sampling unit comprises a second capacitor coupled between the sampling switch and a second reference voltage, and
   wherein the sampling switch is provided outside an electrical path between the first sampling unit and the first switch module, and/or outside an electrical path between the first sampling unit and the second switch module;

the method comprising:

outputting, by the source module, a reference signal indicative of a reset level and an electrical signal indicative of incident light received by the photosensitive unit non-simultaneously, sampling, by the first sampling unit, the electrical signal through turning on the first switch module, sampling, by the second sampling unit, the reference signal through turning on both the first switch module and the sampling switch, reading, by the bus, the sampled signal of the first sampling unit through turning on the second switch module, and reading, by the bus, the sampled signal of the second sampling unit or a weighted average value of the sampled signals of the first and second sampling units, through turning on both the second switch module and the sampling switch.

19. The method of claim 18, further comprising:

sampling, by the second sampling unit, an electrical signal from a first frame through turning on both the first switch module, the first sampling switch and the second sampling switch, sampling, by the first sampling unit, an electrical signal from a second frame through turning on the first switch module, wherein the first frame precedes the second frame, reading, by the bus, the sampled signal of the first sampling unit through turning on the second switch module and the second sampling switch within the readout period of the second frame, reading, by the bus, the sampled signal of the second sampling unit through turning on the second switch module and the first sampling switch within the readout period of the second frame, and calculating, the difference between the two frames or the weighted average of the two frames based on the sampled signal of the first sampling unit and the sampled signal of the second sampling unit.

20. The method of claim 18, further comprising:

detection sample and readout, by the bus, the sampled signal of the first sampling unit of a portion of the plurality of pixel circuits one or more times during exposure time of one frame, and image readout, by the bus, the sampled reference signal of the second sampling unit and the sampled electrical signal of the first sampling unit of the whole plurality of pixel circuits for imaging, when the current sampled electrical signal of the first sampling unit reaches a predetermined criterion.

* * * * *